(12) United States Patent
Tanaka et al.

(10) Patent No.: US 10,530,498 B2
(45) Date of Patent: Jan. 7, 2020

(54) TRANSMISSION DEVICE AND TRANSMISSION METHOD, RECEPTION DEVICE AND RECEPTION METHOD, AND PROGRAM

(71) Applicant: SONY CORPORATION, Tokyo (JP)

(72) Inventors: Katsuyuki Tanaka, Kanagawa (JP); Masayuki Tanaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 52 days.

(21) Appl. No.: 15/519,138

(22) PCT Filed: Oct. 7, 2015

(86) PCT No.: PCT/JP2015/078498
§ 371 (c)(1),
(2) Date: Apr. 13, 2017

(87) PCT Pub. No.: WO2016/063730
PCT Pub. Date: Apr. 28, 2016

(65) Prior Publication Data
US 2017/0230121 A1     Aug. 10, 2017

(30) Foreign Application Priority Data
Oct. 21, 2014  (JP) ................................. 2014-214214

(51) Int. Cl.
*H04B 5/00*     (2006.01)
*H04B 13/00*    (2006.01)
(Continued)

(52) U.S. Cl.
CPC ......... *H04B 13/005* (2013.01); *G01C 21/206* (2013.01); *G01S 1/68* (2013.01);
(Continued)

(58) Field of Classification Search
CPC .................................................. H04B 13/005
(Continued)

(56) References Cited

U.S. PATENT DOCUMENTS 5,914,701 A * 6/1999 Gersheneld ............. G06F 3/017
345/156
6,223,018 B1 * 4/2001 Fukumoto ................ H04B 5/00
379/55.1

(Continued)

FOREIGN PATENT DOCUMENTS

CN    1682495 A    10/2005
EP    1523128 A1   4/2005
(Continued)

OTHER PUBLICATIONS

International Search Report and Written Opinion of PCT Application No. PCT/JP2015/078498, dated Dec. 28, 2015, 5 pages of English Translation and 5 pages of ISRWO.

(Continued)

*Primary Examiner* — April G Gonzales
(74) *Attorney, Agent, or Firm* — Chip Law Group

(57) ABSTRACT

The present disclosure relates to a transmission device and a transmission method, a reception device and a reception method, and a program that enable acquisition of accurate location information in an indoor environment. A reception device includes: an intra-body communication reception unit that receives location identification information from another device by a communication method using the human body as the communication medium, the location identification information being for identifying the location of the reception device; a location recognition unit that recognizes the current location of the reception device in accordance with the received location identification information; and a storage unit that stores the recognized current location. The present disclosure can be applied to transmission/reception (Continued)

devices and the like that perform communication by a communication method using the human body as the communication medium.

16 Claims, 16 Drawing Sheets

(51) Int. Cl.
| | |
|---|---|
| G01S 1/68 | (2006.01) |
| G01C 21/20 | (2006.01) |
| G01S 5/02 | (2010.01) |
| G01S 19/48 | (2010.01) |
| G01S 19/14 | (2010.01) |

(52) U.S. Cl.
CPC .............. *G01S 5/02* (2013.01); *G01S 5/0205* (2013.01); *G01S 5/0263* (2013.01); *G01S 19/14* (2013.01); *G01S 19/48* (2013.01)

(58) Field of Classification Search
USPC ................................................ 455/41.1, 41.2
See application file for complete search history.

(56) References Cited

U.S. PATENT DOCUMENTS

| | | | | |
|---|---|---|---|---|
| 6,754,472 B1* | 6/2004 | Williams | ................ | H04Q 9/04 455/100 |
| 6,864,780 B2* | 3/2005 | Doi | ................ | A61B 5/0028 340/12.22 |
| 6,992,565 B1* | 1/2006 | Giesler | ................ | A61B 5/0028 340/13.2 |
| 7,412,229 B2* | 8/2008 | Ochiai | ................ | G06Q 20/20 340/5.9 |
| 7,443,290 B2* | 10/2008 | Takiguchi | ................ | A61L 15/60 340/539.1 |
| 7,480,492 B2* | 1/2009 | Williams | ................ | H04Q 9/04 455/100 |
| 7,612,651 B2* | 11/2009 | Ishibashi | ................ | G07C 9/00111 340/5.2 |
| 7,668,122 B2* | 2/2010 | Sung | ................ | H04B 13/005 370/280 |
| 8,044,768 B2* | 10/2011 | Nakasato | ................ | B60R 25/2027 340/426.16 |
| 8,045,920 B2* | 10/2011 | Pollabauer | ................ | G07C 9/00111 455/41.1 |
| 8,094,807 B2* | 1/2012 | Ishibashi | ................ | G07F 19/00 340/5.1 |
| 8,224,244 B2* | 7/2012 | Kim | ................ | H04B 13/005 340/13.22 |
| 8,280,302 B2* | 10/2012 | Kubono | ................ | H04B 5/0012 340/10.51 |
| 8,633,809 B2* | 1/2014 | Schenk | ................ | H04B 13/005 340/286.01 |
| 8,668,145 B2* | 3/2014 | Tessier | ................ | G06K 7/08 235/380 |
| 8,982,094 B2* | 3/2015 | Pi | ................ | H04W 76/14 345/174 |
| 9,042,917 B2* | 5/2015 | Edge | ................ | H04W 64/00 342/453 |
| 9,320,433 B2* | 4/2016 | Kataoka | ................ | A61B 5/0402 |
| 9,341,014 B2* | 5/2016 | Oshima | ................ | H04B 10/11 |
| 9,386,479 B2* | 7/2016 | Douglas | ................ | H04W 28/10 |
| 9,606,682 B2* | 3/2017 | Walley | ................ | G06F 3/011 |
| 2003/0176196 A1* | 9/2003 | Hall | ................ | G01S 5/0205 455/456.1 |
| 2006/0077172 A1* | 4/2006 | Fukumoto | ................ | H04B 13/00 345/156 |
| 2007/0021124 A1* | 1/2007 | Niu | ................ | G01S 5/0289 455/456.1 |
| 2008/0209545 A1* | 8/2008 | Asano | ................ | H04L 9/3273 726/19 |
| 2010/0317390 A1* | 12/2010 | Rekimoto | ................ | H04W 64/00 455/511 |
| 2012/0013446 A1* | 1/2012 | Ino | ................ | A61B 5/0024 340/10.1 |
| 2012/0088525 A1* | 4/2012 | Kurokawa | ................ | H04W 4/021 455/456.5 |
| 2014/0081156 A1* | 3/2014 | Ohsawa | ................ | A61B 5/1123 600/483 |
| 2014/0120931 A1* | 5/2014 | Shin | ................ | H04W 64/00 455/452.1 |
| 2014/0141796 A1* | 5/2014 | Marti | ................ | G01S 5/0252 455/456.1 |
| 2014/0184555 A1* | 7/2014 | Pi | ................ | H04W 76/14 345/174 |
| 2014/0186026 A1* | 7/2014 | Oshima | ................ | H04B 10/116 398/25 |
| 2014/0186048 A1* | 7/2014 | Oshima | ................ | H04B 10/541 398/118 |
| 2014/0186049 A1* | 7/2014 | Oshima | ................ | H04B 10/1143 398/118 |
| 2014/0186050 A1* | 7/2014 | Oshima | ................ | H04B 10/1143 398/118 |
| 2014/0194140 A1* | 7/2014 | Takano | ................ | H04W 4/043 455/456.1 |
| 2014/0221894 A1* | 8/2014 | Nagasaka | ................ | A61H 3/00 602/23 |
| 2014/0228048 A1* | 8/2014 | Saito | ................ | G01S 5/0252 455/456.1 |
| 2014/0232903 A1* | 8/2014 | Oshima | ................ | H04N 5/3532 348/229.1 |
| 2014/0286644 A1* | 9/2014 | Oshima | ................ | H04B 10/11 398/118 |
| 2015/0126896 A1* | 5/2015 | AlHazme | ................ | A61B 5/01 600/549 |
| 2015/0334576 A1* | 11/2015 | Sofman | ................ | H04W 16/18 455/456.1 |

FOREIGN PATENT DOCUMENTS

| | | |
|---|---|---|
| JP | 2003-188833 A | 7/2003 |
| JP | 3976203 B2 | 9/2007 |
| KR | 10-2005-0027114 A | 3/2005 |
| WO | 2004/010651 A1 | 1/2004 |

OTHER PUBLICATIONS

International Preliminary Report on Patentability of PCT Application No. PCT/JP2015/078498, dated May 4, 2017, 7 pages of English Translation and 3 pages of IPRP.

* cited by examiner

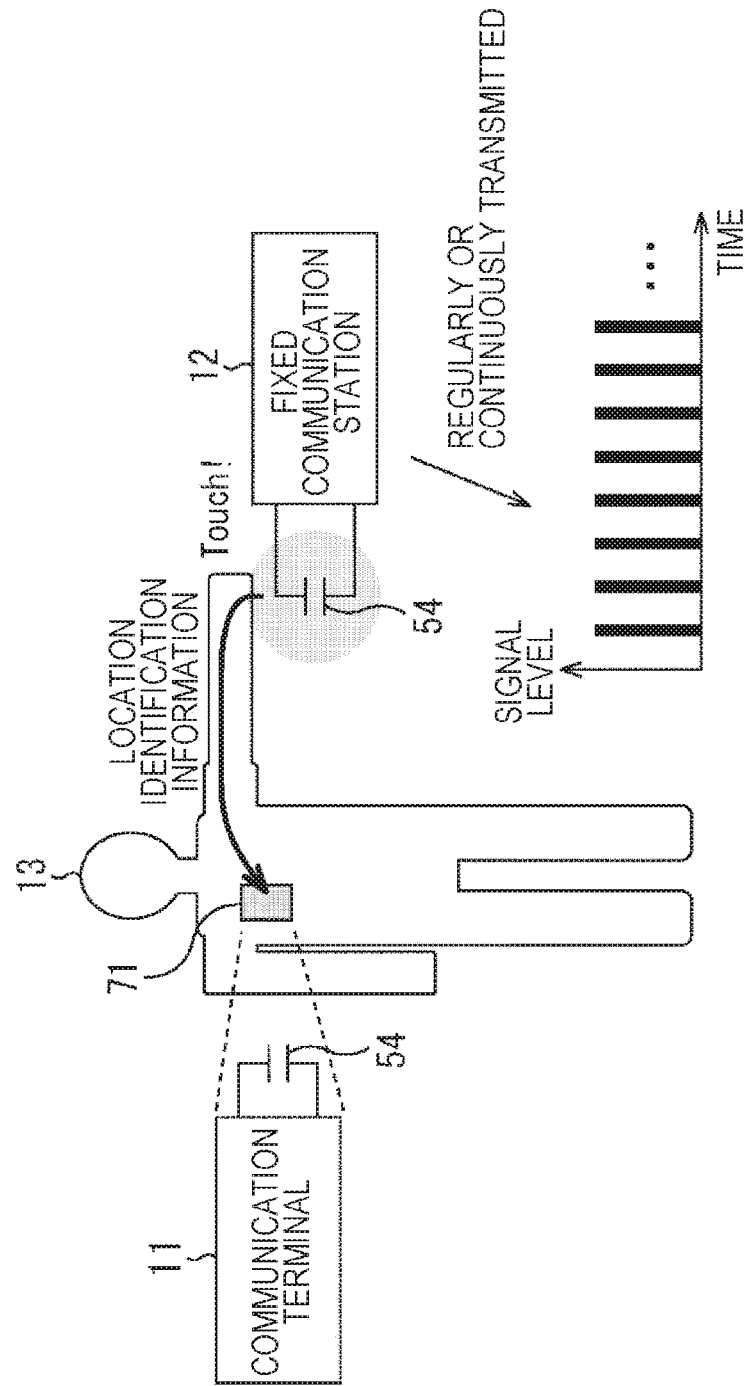

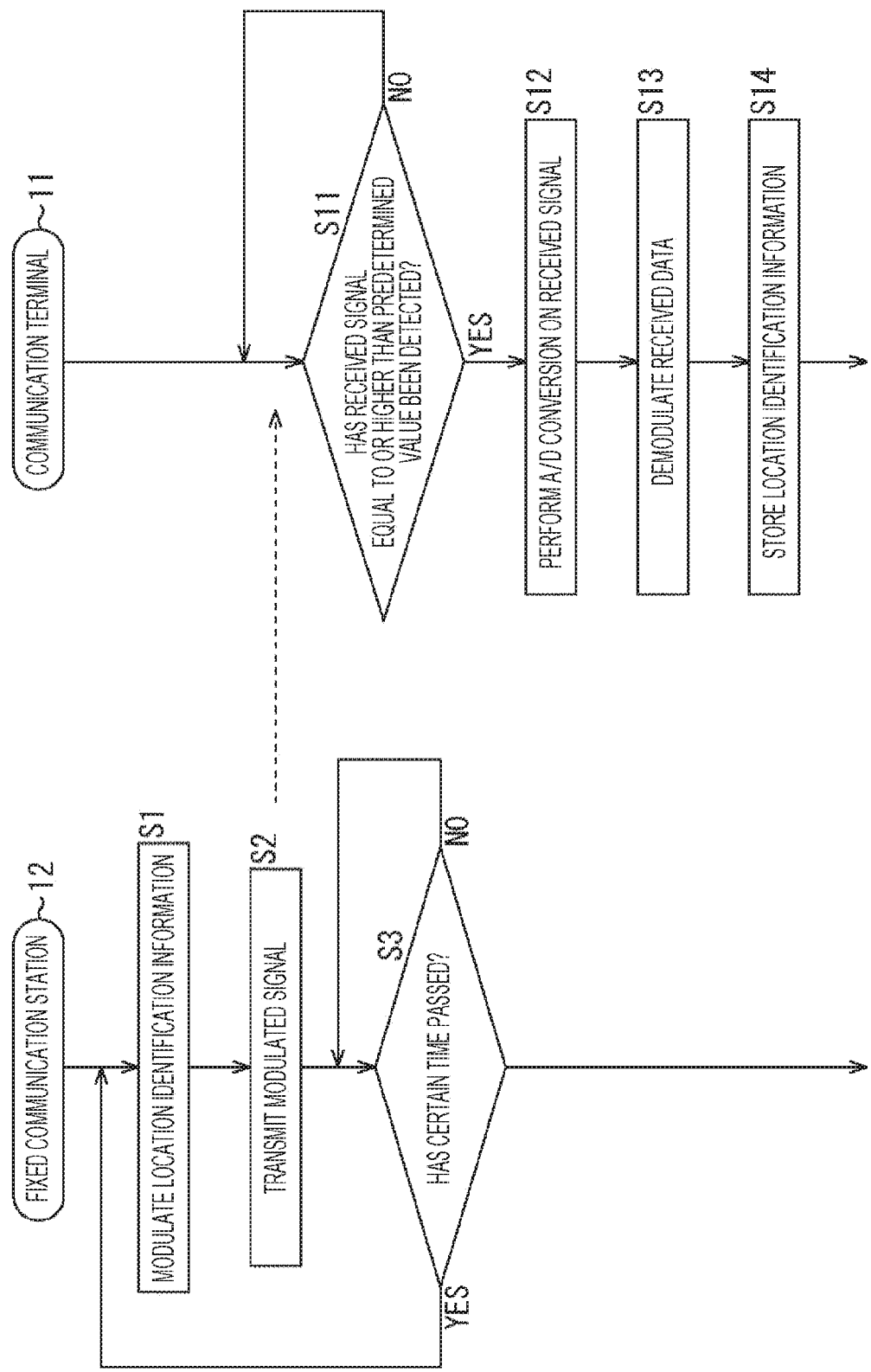

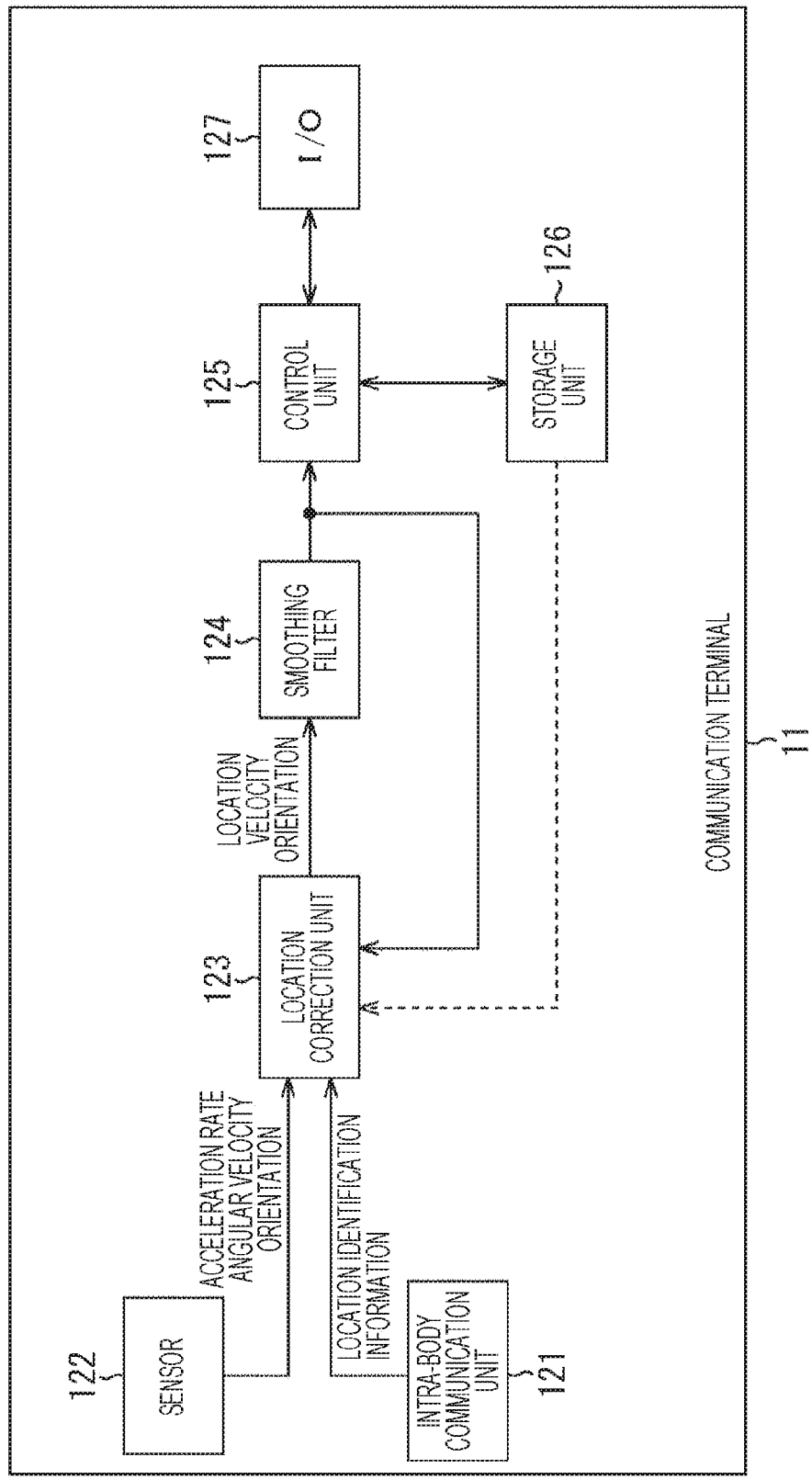

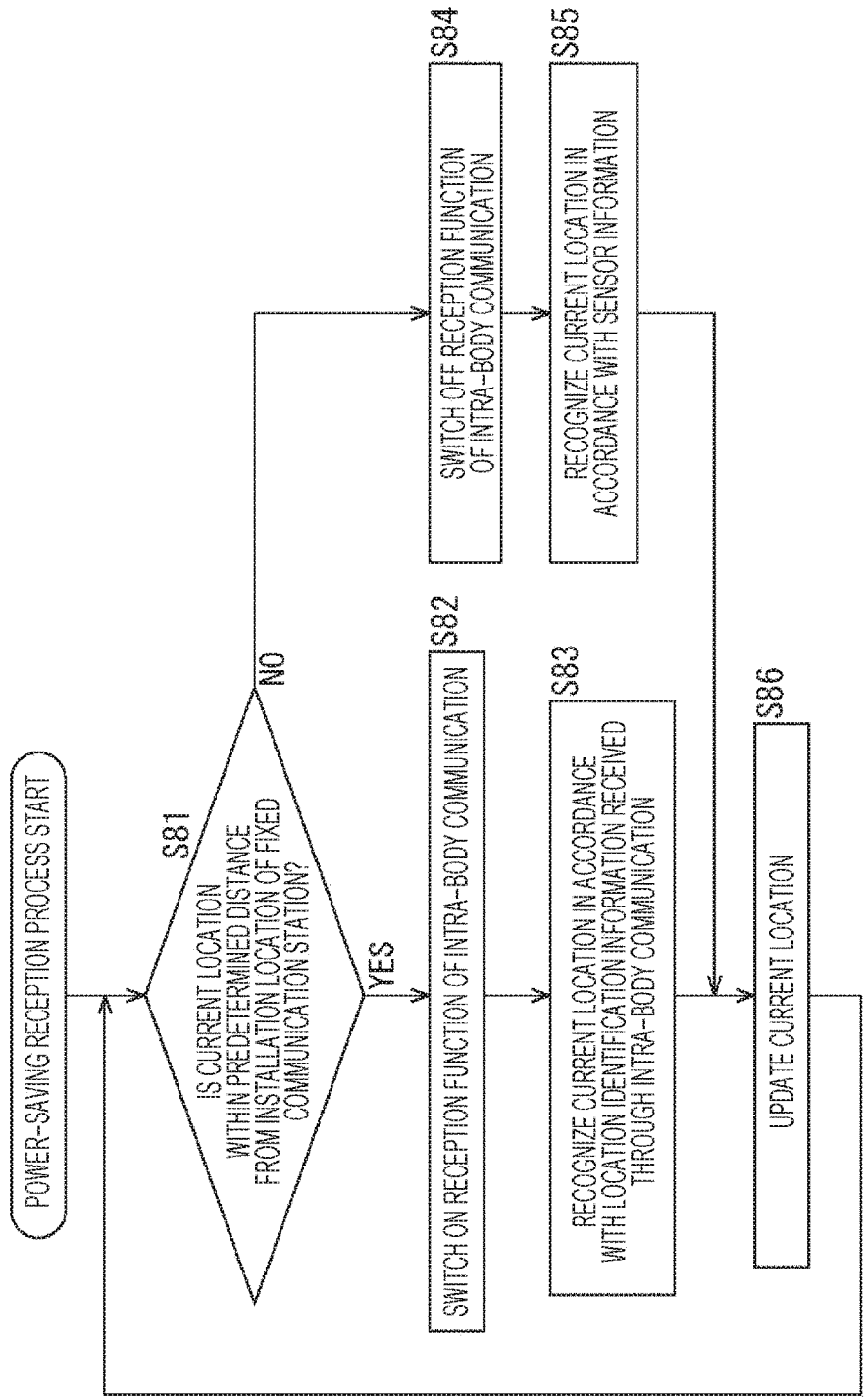

TRANSMISSION DEVICE AND TRANSMISSION METHOD, RECEPTION DEVICE AND RECEPTION METHOD, AND PROGRAM

CROSS REFERENCE TO RELATED APPLICATIONS

This application is a U.S. National Phase of International Patent Application No. PCT/JP2015/078498 filed on Oct. 7, 2015, which claims priority benefit of Japanese Patent Application No. JP 2014-214214 filed in the Japan Patent Office on Oct. 21, 2014. Each of the above-referenced applications is hereby incorporated herein by reference in its entirety.

TECHNICAL FIELD

The present disclosure relates to transmission devices and transmission methods, reception devices and reception methods, and programs, and more particularly, to a transmission device and a transmission method, a reception device and a reception method, and a program that enable acquisition of accurate location information in an indoor environment.

BACKGROUND ART

Positioning systems such as Global Positioning System (GPS) that measures the current location by receiving signals transmitted from satellites are now widely used. However, with a positioning system that uses satellite signals, it is difficult to detect a location in an indoor environment where signals from satellites cannot be received.

In addition to conventional navigation services, various services using location information, such as offering of content according to locations, marketing, behavior analyses, asset management, and safety planning, are now provided, and the importance of location information is increasing accordingly.

As a method of measuring a location in an indoor environment, indoor location measurement using radio beacons of Wi-Fi (trademark) or Bluetooth (registered trademark) is becoming popular (see Non-Patent Document 1, for example).

There also are various other suggested location measurement methods, such as Indoor Messaging System (IMES) using the GPS signal format (see Non-Patent Document 2, for example), autonomous location measurement using a gyro sensor or the like without any wireless component, and the use of visible light or a magnetic field distribution.

CITATION LIST

Non-Patent Documents

Non-Patent Document 1: "Trends of Wi-Fi Location Information Solutions in the United States" (online), June 2013, Information-technology Promotion Agency, Japan (IPA) (searched on Sep. 29, 2014), on the Internet <URL: https://www.ipa.go.jp/files/000029440.pdf>

Non-Patent Document 2: "Opening Up Indoors: Japan's Indoor Messaging System, IMES" (online), May 1, 2011, GPS World (searched on Sep. 29, 2014), on the Internet <URL: http://gpsworld.com/wirelessindoor-positioningopening-up-indoors-11603/>

SUMMARY OF THE INVENTION

Problems to be Solved by the Invention

Indoor location measurement using radio beacons of Wi-Fi (trademark) or a Bluetooth (registered trademark) is poor in accuracy, and therefore, it is difficult to acquire accurate location information through such location measurement. It is also difficult to acquire accurate location information through autonomous location measurement using a gyro sensor or the like, because relative location measurement is carried out, and errors are integrated over time.

The present disclosure is made in view of those circumstances, and is to acquire accurate location information in indoor environments.

Solutions to Problems

A reception device according to a first aspect of the present disclosure includes: an intra-body communication reception unit that receives location identification information from another device by a communication method using the human body as the communication medium, the location identification information being for identifying the location of the reception device; a location recognition unit that recognizes the current location of the reception device in accordance with the received location identification information; and a storage unit that stores the recognized current location.

A reception method according to the first aspect of the present disclosure is implemented by a reception device that includes a storage unit storing predetermined information. The reception method includes: receiving location identification information from another device by a communication method using the human body as the communication medium, the location identification information being for identifying the location of the reception device; and recognizing the current location of the reception device in accordance with the received location identification information, and storing the current location into the storage unit.

A program according to the first aspect of the present disclosure causes a computer to perform a process that includes: controlling reception of location identification information from another device by a communication method using the human body as the communication medium, the location identification information being for identifying the location of the computer; recognizing the current location of the computer in accordance with the received location identification information; and storing the recognized current location into a storage unit.

In the first aspect of the present disclosure, location identification information for identifying the location of the reception device is received from another device by a communication method using the human body as the communication medium, and the current location of the reception device is recognized in accordance with the received location identification information and is stored into the storage unit.

A transmission device according to a second aspect of the present disclosure includes: a storage unit that stores location identification information for identifying the location of the transmission device; and an intra-body communication transmission unit that transmits the location identification information to another device by a communication method using the human body as the communication medium.

A transmission method according to the second aspect of the present disclosure is implemented by a transmission device that includes a storage unit storing location identifying information for identifying a location of the transmission device. The transmission method includes transmitting the location identification information to another device by a communication method using the human body as the communication medium.

A program according to the second aspect of the present disclosure causes a computer to perform a process that includes transmitting location identification information to another device by a communication method using the human body as the communication medium, the location identification information being stored in a storage unit and being for identifying the location of the computer.

In the second aspect of the present disclosure, location identification information that is stored in the storage unit and is for identifying the location of the transmission device is transmitted to another device by a communication method using the human body as the communication medium.

It should be noted that the programs to be provided may be transmitted via a transmission medium or may be recorded on a recording medium.

The reception device and the transmission device may be independent devices or may be internal blocks which form one device.

Effects of the Invention

According to the first and second aspects of the present disclosure, accurate location information can be acquired in indoor environments.

It should be noted that the effect is not necessarily limited to that described herein, and may be any effect described in the present disclosure.

BRIEF DESCRIPTION OF DRAWINGS

FIG. 3 is a diagram for explaining intra-body communication.

FIG. 5 is a flowchart for explaining an intra-body communication process.

FIG. 8 is a block diagram showing another embodiment of a communication terminal.

FIG. 16 is a flowchart for explaining a power-saving reception process.

MODE FOR CARRYING OUT THE INVENTION

<Example Configuration of a Communication System>

Figure 1:
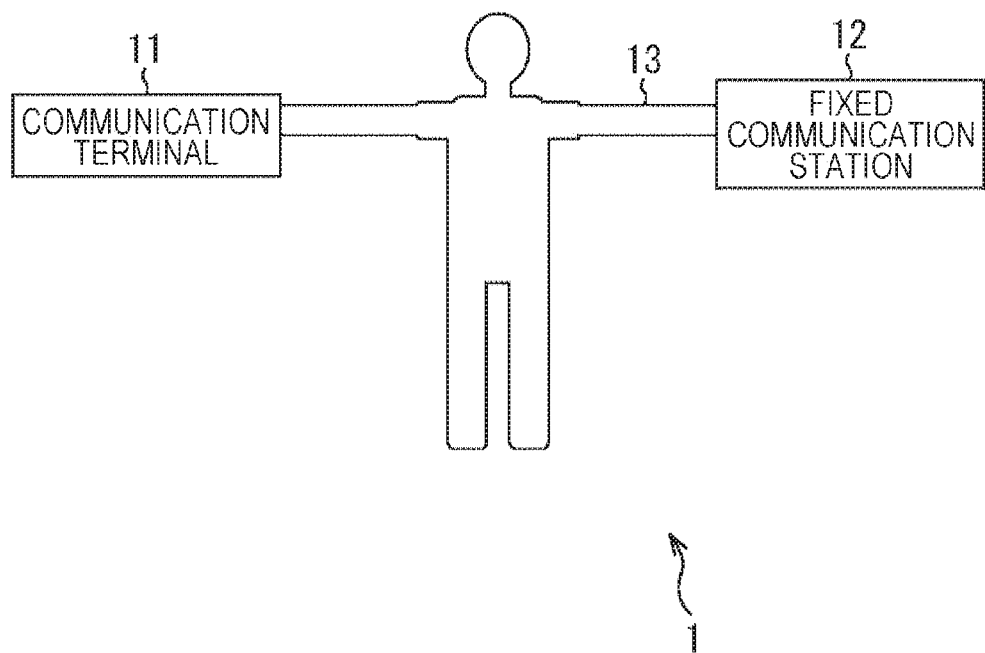
FIG. 1 is a diagram showing an example configuration of an embodiment of a communication system according to the present disclosure.

FIG. 1 shows an example configuration of an embodiment of a communication system according to the present disclosure.

The communication system 1 shown in FIG. 1 is an intra-body communication system that includes a communication terminal 11 and a fixed communication station 12, and the communication terminal 11 and the fixed communication station 12 communicate with each other via the body of a user 13 serving as the communication medium.

The communication terminal 11 is carried or worn by the user 13, and the fixed communication station 12 is installed at a place by which the user 13 frequently passes, or at a portion the user 13 often touches.

Location identification information for finding the location (place) at which the fixed communication station 12 is installed is transmitted from the fixed communication station 12, with the body of the user 13 serving as the communication medium. The communication terminal 11 receives the location identification information, and stores the location identification information therein.

With the communication medium being the body of the user 13 touching or in the vicinity of the fixed communication station 12, the fixed communication station 12 transmits the location identification information about the fixed communication station 12 to the communication terminal 11 of the user 13. The fixed communication station 12 transmits the location identification information continuously or on a regular basis (at regular time intervals).

It should be noted that, in the description below, the user 13 touches the fixed communication station 12 so that communication is performed via the body of the user 13 serving as the communication medium. However, communication can also be performed when part of the human body is brought within a range of several centimeters from the antenna (electrodes 54 in FIG. 2) of the fixed communication station 12, for example.

<Example Configuration of a Transmission/Reception Device>

Figure 2:
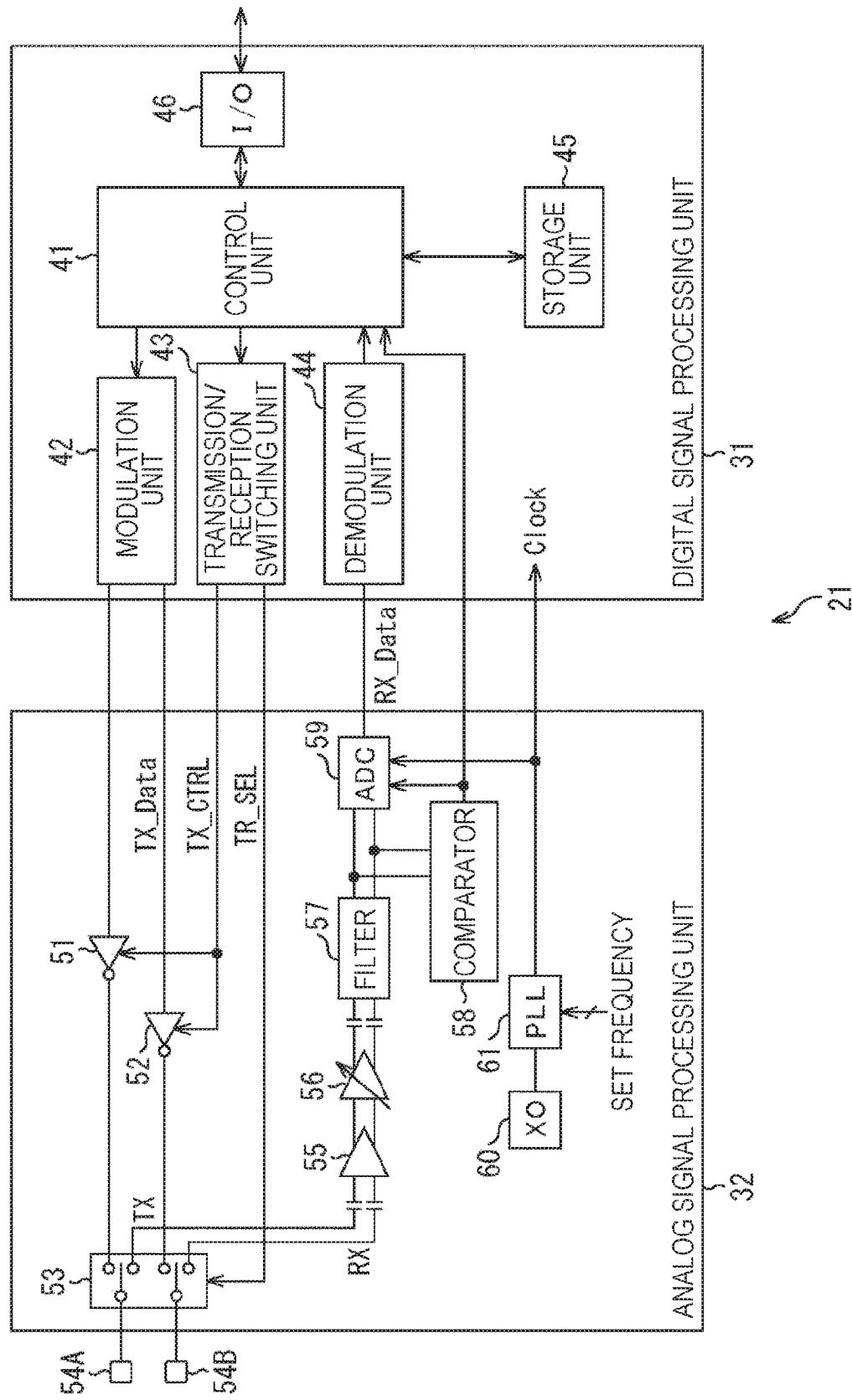
FIG. 2 is a block diagram showing an example configuration of a transmission/reception device that can operate as a communication terminal and a fixed communication station.

FIG. 2 shows an example configuration of a transmission/reception device (an intra-body communication device) that can operate as the communication terminal 11 and the fixed communication station 12.

That is, the communication terminal 11 and the fixed communication station 12 can have the common configuration of the transmission/reception device 21 shown in FIG. 2. It should be noted that the communication terminal 11 and the fixed communication station 12 may of course have configurations specially designed to achieve a transmission function and a reception function, respectively, as will be described later with reference to FIGS. 6 and 7.

The transmission/reception device 21 is divided into a digital signal processing unit 31 that performs processing with digital signals, and an analog signal processing unit 32 that performs processing with analog signals.

The digital signal processing unit 31 includes a control unit 41, a modulation unit 42, a transmission/reception switching unit 43, a demodulation unit 44, a storage unit 45, and an input/output unit (I/O) 46.

The control unit 41 is formed with a central processing unit (CPU), a read only memory (ROM), a random access memory (RAM), and the like, and executes various programs to control the respective units such as the modulation unit 42, the transmission/reception switching unit 43, and the demodulation unit 44, and thus control data transmission and reception.

In a case where the transmission/reception device 21 is used as the communication terminal 11, when the transmission/reception device 21 receives a received signal at a predetermined signal level or higher, a detection signal indicating that a received signal has been detected is supplied from a comparator 58 that will be described later. When the detection signal is supplied from the comparator 58, the control unit 41 starts controlling a receiving operation. The location identification information extracted from the received signal is then supplied from the demodulation unit 44 to the control unit 41. In accordance with the supplied location identification information, the control unit 41 recognizes the current location of its own (the transmission/reception device 21), and stores the result of the recognition into the storage unit 45.

In a case where the transmission/reception device 21 is used as the fixed communication station 12, on the other hand, the control unit 41 acquires the location identification information stored in the storage unit 45, and supplies the location identification information to the modulation unit 42.

Therefore, in a case where the transmission/reception device 21 is used as the communication terminal 11, the control unit 41 functions as a reception control unit that controls reception, and a location recognition unit that recognizes the current location of its own. In a case where the transmission/reception device 21 is used as the fixed communication station 12, on the other hand, the control unit 41 functions as a transmission control unit that causes transmission of the location identification information.

The modulation unit 42 performs a modulation process on transmission data TX_Data in accordance with a modulation scheme predetermined as an intra-body communication format, and outputs the transmission data TX_Data of the resultant digital modulated signal to the analog signal processing unit 32. The modulation scheme may be amplitude modulation, frequency modulation, or the like.

Under the control of the control unit 41, the transmission/reception switching unit 43 supplies the analog signal processing unit 32 with a switch signal TR_SEL for switching between transmission and reception, and a transmission control signal TX_CTRL.

The demodulation unit 44 performs a demodulation process on received data RX_Data supplied from the analog signal processing unit 32 in accordance with a modulation scheme predetermined as an intra-body communication format, and supplies the resultant data to the control unit 41.

The storage unit 45 stores data and programs supplied from an external device via the input/output unit 46, and data and the like supplied from the analog signal processing unit 32. The programs stored in the storage unit 45 include a program for the control unit 41 to control operation of the entire transmission/reception device 21. The storage unit 45 is formed with a nonvolatile memory such as an electronically erasable and programmable read only memory (EEPROM), or a battery-backed static random access memory (SRAM), for example.

In a case where the transmission/reception device 21 is used as the fixed communication station 12, the storage unit 45 stores the location identification information for finding the location (place) at which the fixed communication station 12 is installed. This location identification information may be location information indicating the latitude and the longitude of the place where the fixed communication station 12 is installed, the location ID for identifying predetermined location information in a location database storing a large number of sets of location information, or the like.

In a case where the transmission/reception device 21 is used as the communication terminal 11, on the other hand, the storage unit 45 stores the location identification information received from the fixed communication station 12. Also, in a case where the location identification information is supplied in the form of a location ID in a location database, the location database for identifying the location information corresponding to the location ID is also stored.

The input/output unit 46 is formed with a universal asynchronous receiver transmitter (UART), for example, and inputs/outputs signals in a predetermined signal format from/to an external device.

The analog signal processing unit 32 includes MOS inverters 51 and 52, a selector 53, electrodes 54A and 54B, a low noise amplifier (LNA) 55, a gain-controlled amplifier 56, a filter 57, a comparator 58, an ADC 59, a reference oscillator (XO) 60, and a PLL circuit 61.

The MOS inverters 51 and 52 function as transmission drivers for supplying signals to the electrodes 54A and 54B serving as an antenna, and, in accordance with the transmission control signal TX_CTRL supplied from the transmission/reception switching unit 43 of the digital signal processing unit 31, outputs an inversion signal of the transmission data TX_Data.

In accordance with the switch signal TR_SEL supplied from the transmission/reception switching unit 43 of the digital signal processing unit 31, the selector 53 switches between a transmission terminal for transmitting a signal and a reception terminal for receiving a signal. When the selector 53 is connected to the transmission terminal, the electrodes 54A and 54B serving as an antenna are connected to the MOS inverters 51 and 52. When the selector 53 is connected to the reception terminal, the electrodes 54A and 54B are connected to the low noise amplifier 55.

The two electrodes 54A and 54B is an antenna (a transmission/reception unit) that transmits and receives intra-body communication signals. One of the two electrodes 54A and 54B functions as a signal electrode, and the other one functions as a reference electrode. The signal electrode is an electrode for transmitting a signal to be transferred via a communication medium, and the reference electrode is an electrode for obtaining the reference point for determining the level of a signal. In the description below, the two electrodes 54A and 54B will be referred to simply as the electrodes 54 unless there is a need to make a distinction.

The low noise amplifier 55 amplifies a received signal received by the electrodes 54, and outputs the received signal to the gain-controlled amplifier 56. The gain-controlled amplifier 56 amplifies the received signal supplied from the low noise amplifier 55 to a predetermined signal level, and outputs the signal to the filter 57.

The filter 57 is formed with a high-pass filter (HPF), a low-pass filter (LPF), or the like, and removes signals in a predetermined frequency band, and outputs the result to the comparator 58 and the ADC 59.

The comparator 58 compares the signal level of the received signal supplied from the filter 57 with a predetermined value (a reception reference level), and determines whether the signal level of the received signal supplied from the filter 57 is equal to or higher than the predetermined value. If the signal level of the received signal supplied from the filter 57 is determined to be equal to or higher than the predetermined value, the comparator 58 supplies the ADC 59 and the control unit 41 with a detection signal indicating that a received signal has been detected. It should be noted that the comparator 58 may be provided in a stage after the ADC 59, and determine whether a received signal has been detected from the signal level after A/D conversion.

When a detection signal indicating that a received signal has been detected is supplied from the comparator 58, the ADC 59 converts the analog received signal that is supplied from the filter 57 and is in a predetermined frequency band, to a digital signal, and supplies the resultant digital received data RX_Data to the demodulation unit 44 of the digital signal processing unit 31.

The reference oscillator 60 is formed with a crystal oscillator, for example, and outputs a clock signal at a reference frequency (this clock signal will be hereinafter referred to as the reference clock signal) to the PLL circuit 61. Using the reference clock signal supplied from the reference oscillator 60, the PLL circuit 61 generates a clock signal at a predetermined set frequency, and supplies the clock signal to the ADC 59, the digital signal processing unit 31, and the like, as appropriate. The set frequency can be set (changed) from outside.

The transmission/reception device 21 having the above configuration forms an electrical field around the two electrodes 54, which are equivalent to a capacitor in terms of the circuit configuration. The transmission/reception device 21 transfers changes in the electrical field via the human body serving as the communication medium, and transmits and receives predetermined information.

It should be noted that the intra-body communication method is not necessarily the above described field-involving method for transferring information using changes in the electrical field, and may be some other communication scheme, such as a current-involving method for transferring information by outputting a weak electrical current to the human body and modulating the electrical current. That is, the intra-body communication method in this embodiment is not limited to a certain method, and may be any appropriate method using the human body as the communication medium.

The transmission/reception device 21 may be designed as an independent device, or may be formed as a communication chip module or a communication IC. For example, the transmission/reception device 21 can be incorporated into another device such as a smartphone (a mobile terminal).

FIG. 3 is a diagram for explaining intra-body communication to be performed by the communication terminal 11 and the fixed communication station 12.

It should be noted that FIG. 3 shows the communication terminal 11 and the fixed communication station 12 in a simplified manner, except for the electrodes 54. This also applies to FIGS. 4A, 4B, 4C and 4D and the later drawings.

The fixed communication station 12 regularly or continuously transmits location identification information for finding the location at which the fixed communication station 12 is installed.

The functions of the communication terminal 11 are incorporated into a smartphone 71 carried by the user 13. For example, when the user 13 carrying the smartphone 71 touches (comes into contact with) the signal electrode, which is one of the electrodes 54 of the fixed communication station 12, the communication terminal 11 in the smartphone 71 receives location identification information transmitted from the fixed communication station 12 via the body of the user 13 serving as the communication medium, and stores the location identification information into the storage unit 45 in the communication terminal 11. In this manner, the location identification information indicating the place by which the user 13 has passed and the place where the user 13 has stayed is stored into the storage unit 45 of the communication terminal 11.

FIGS. 4A, 4B, 4C and 4D show examples of installation of the communication terminal 11 and the fixed communication station 12.

Figure 4A:
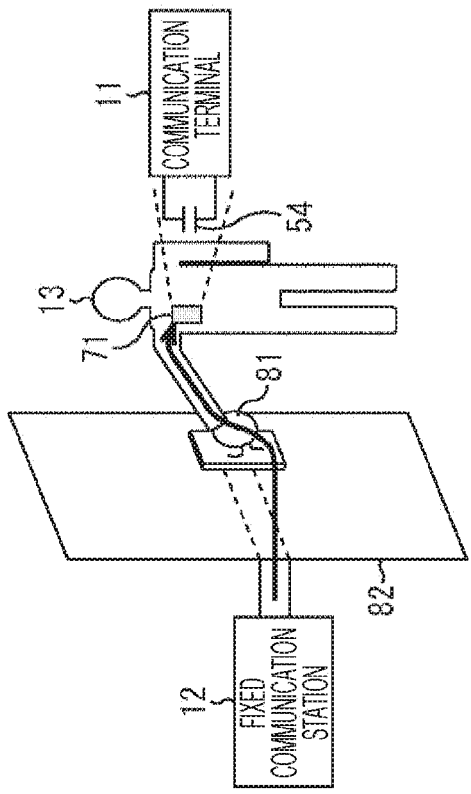
FIGS. 4A, 4B, 4C and 4D are diagrams showing examples of installation of the communication terminal and the fixed communication station.

FIG. 4A shows an example where the fixed communication station 12 is installed in a door.

The electrodes 54 of the fixed communication station 12 are buried in a door knob 81. When the user 13 carrying the smartphone 71 touches the door knob 81 to open the door 82, the communication terminal 11 in the smartphone 71 can acquire the location identification information transmitted from the fixed communication station 12.

Figure 4B:
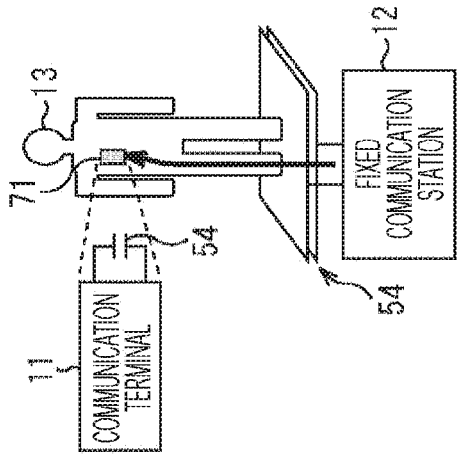

FIG. 4B shows an example where the fixed communication station 12 is installed in a floor.

The two electrodes 54 of the fixed communication station 12 are laid in a floor. When the user 13 carrying the smartphone 71 moves across the floor in which the electrodes 54 of the fixed communication station 12 are laid, the communication terminal 11 in the smartphone 71 can acquire the location identification information transmitted from the fixed communication station 12.

Figure 4C:
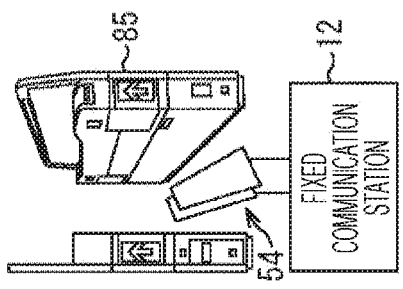

FIG. 4C shows an example where the fixed communication station 12 is installed in an automatic ticket gate.

The two electrodes 54 of the fixed communication station 12 are laid in the floor of the passage of an automatic ticket gate 85. When the user 13 carrying the smartphone 71 moves through the passage of the automatic ticket gate 85, the communication terminal 11 in the smartphone 71 can acquire the location identification information transmitted from the fixed communication station 12.

Figure 4D:
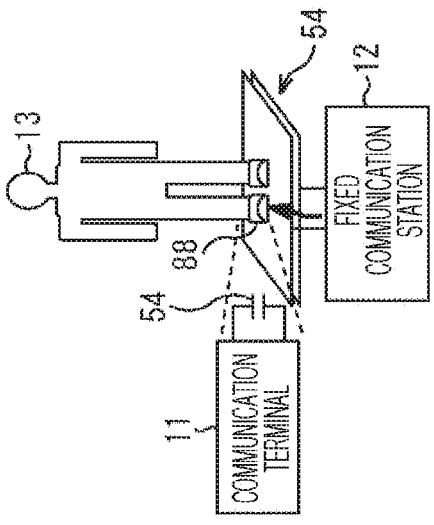

FIG. 4D shows an example where the communication terminal 11 is installed in a shoe.

The communication terminal 11 is buried in a shoe 88 the user 13 is wearing. When the user 13 wearing the shoe 88 moves across the floor in which the two electrodes 54 of the fixed communication station 12 are laid, the communication terminal 11 in the shoe 88 can acquire the location identification information transmitted from the fixed communication station 12.

<Intra-Body Communication Process to be Performed by the Communication System>

Referring now to the flowchart in FIG. 5, an intra-body communication process to be performed by the communication terminal 11 and the fixed communication station 12 is described.

First, a transmission process to be performed by the fixed communication station 12 is described.

In step S1, the control unit 41 of the fixed communication station 12 acquires the location identification information stored in the storage unit 45, and supplies the location identification information to the modulation unit 42. The modulation unit 42 performs a predetermined modulation process on the supplied location identification information, and supplies the analog signal processing unit 32 with transmission data TX_Data that is the resultant digital modulated signal.

In step S2, the analog signal processing unit 32 generates an analog modulated signal in accordance with the transmission data TX_Data supplied from the modulation unit 42, and transmits the analog modulated signal from the electrodes 54.

In step S3, the control unit 41 determines whether a certain period of time has passed since the modulated signal corresponding to the location identification information was transmitted in step S2, and repeats the process in step S3 until the control unit 41 determines that the certain period of time has passed.

If the certain period of time is determined to have passed in step S3, the process returns to step S1, and the above described steps S1 through S3 are repeated. In this manner, the fixed communication station 12 transmits location identification information at predetermined time intervals. In a case where the time intervals at which location identification information is transmitted are extremely short, location identification information is continuously transmitted.

Next, a reception process to be performed by the communication terminal 11 is described.

First, in step S11, the analog signal processing unit 32 of the communication terminal 11 determines whether a received signal at a signal level equal to or higher than a predetermined value has been detected, and repeats the process in step S11 until the analog signal processing unit 32 determines that a received signal equal to or higher than the predetermined value has been detected.

If the analog signal processing unit 32 determines in step S11 that a received signal equal to or higher than the predetermined value has been detected, the process moves onto step S12. After performing an amplification process and a filtering process on the received signal, the analog signal processing unit 32 supplies the resultant digital received data RX_Data to the demodulation unit 44 of the digital signal processing unit 31.

In step S13, the demodulation unit 44 of the digital signal processing unit 31 performs a demodulation process on the received data RX_Data supplied from the analog signal processing unit 32, and supplies the resultant location identification information to the control unit 41.

In step S14, the control unit 41 stores the location identification information supplied from the demodulation unit 44 into the storage unit 45, and then ends the reception process.

Through the above described intra-body communication process by the communication terminal 11 and the fixed communication station 12, the communication terminal 11 can acquire the location identification information associated with an object touched by the user 13. Thus, accurate location information can be acquired even in an indoor space where transmission signals transmitted from any positioning satellite cannot be received.

Also, as the fixed communication station 12 is installed in an object to be touched by the user 13, the error range of location identification information is narrower, and it is possible to acquire more accurate location information than by a location measurement method using radio beacons of Wi-Fi (trademark) or Bluetooth (registered trademark).

<Example Configurations of a Transmission Device and a Reception Device>

In the above description, the transmission/reception device 21 having both a transmission function and a reception function is used as both the communication terminal 11 and the fixed communication station 12. However, the communication terminal 11 may be a reception device that has only the reception function of intra-body communication, and the fixed communication station 12 may be a transmission device that has only the transmission function of intra-body communication.

Figure 6:
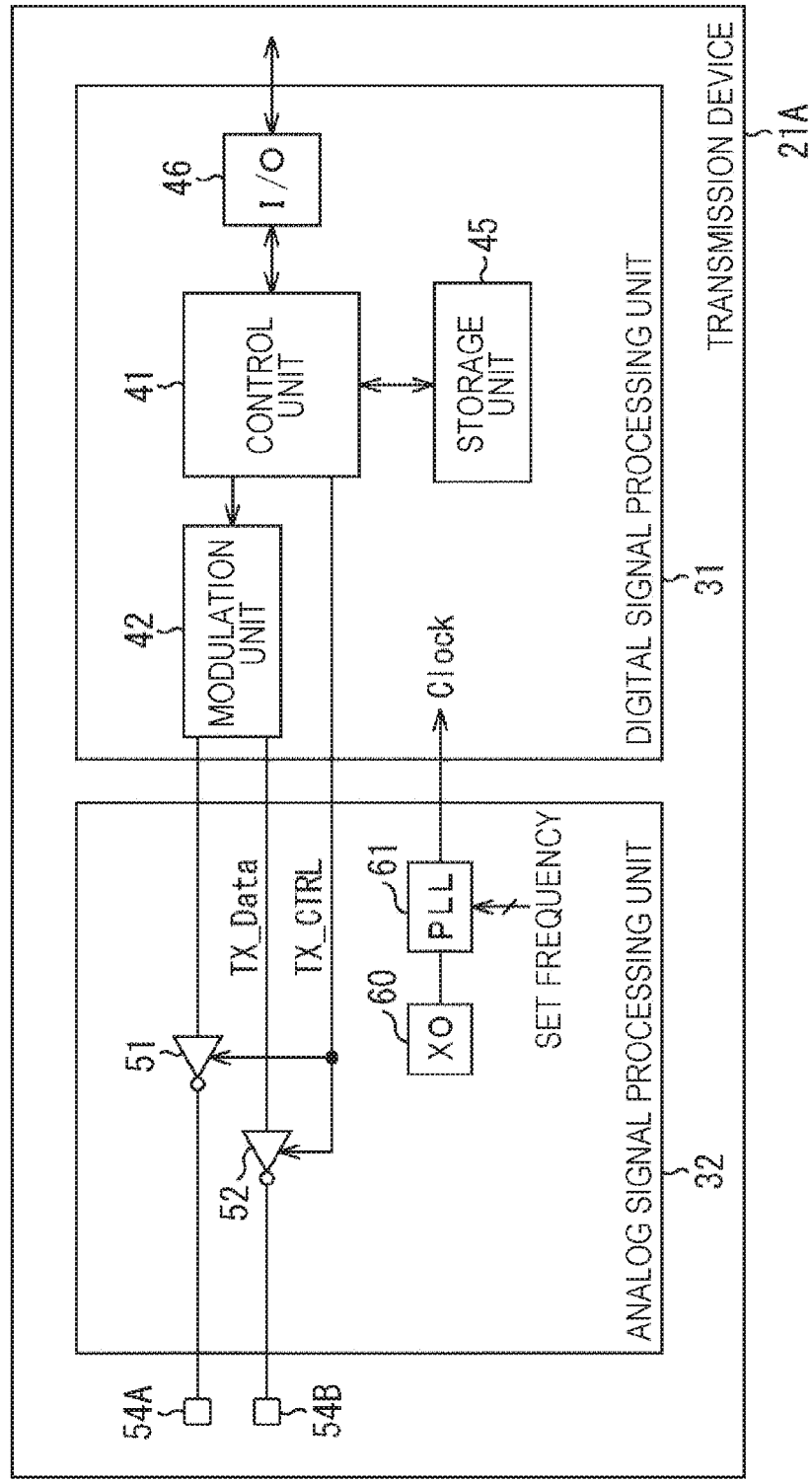
FIG. 6 is a block diagram showing an example configuration of a transmission device.
Figure 7:
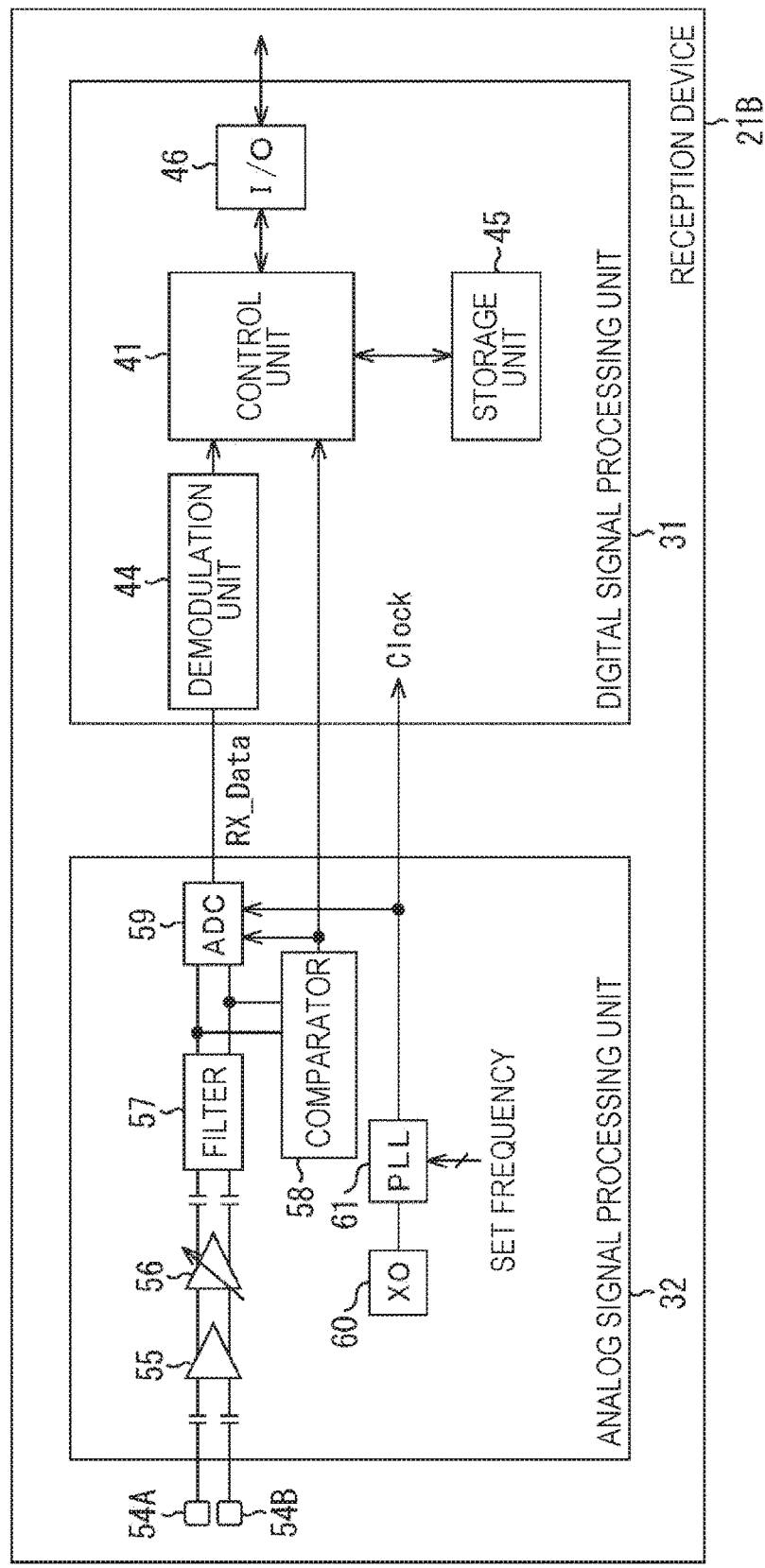
FIG. 7 is a block diagram showing an example configuration of the reception device.

FIG. 6 shows an example configuration of a transmission device that has only the transmission function of intra-body communication. FIG. 7 shows an example configuration of a reception device that has only the reception function of intra-body communication.

The transmission device 21A shown in FIG. 6 has the same configuration as the configuration of the transmission/reception device 21 shown in FIG. 2, except that the components necessary only in the reception function are eliminated.

The reception device 21B shown in FIG. 7 has the same configuration as the configuration of the transmission/reception device 21 shown in FIG. 2, except that the components necessary only in the transmission function are eliminated.

In FIGS. 6 and 7, the components equivalent to those of the transmission/reception device 21 shown in FIG. 2 are denoted by the same reference numerals as those used in FIG. 2, and therefore, explanation of the components will not be repeated below.

One of the remarkable features of intra-body communication is that only a low transmission power is required. In Wi-Fi (trademark) and Bluetooth (registered trademark), however, electrical power on the order of mW is emitted outward, and therefore, electrical power on the order of mW at the minimum is required for transmission, with losses in the transmission power and the transmission amplifier being taken into account. In intra-body communication, on the other hand, an electrical field is formed around the two electrodes 54 that are equivalent to a capacitor in terms of the circuit configuration. With this, electromagnetic energy is not emitted outward, and is only accumulated. Thus, relative to a capacity of several pF at a maximum, the electrical power to be consumed at a time of transmission in intra-body communication is mostly the electrical power that is charged and discharged at the time of transmission data transition, and may be lower than the order of mW.

In a case where a large number of fixed communication stations 12 are installed, the power supply is not easy to obtain from outside in some environments. Also, in an indoor space, the installation location might be changed with a change in the floor layout or the like. Therefore, the fixed communication station 12 is preferably driven by a battery so that the installation and the location can be easily changed.

In view of this, the transmission device 21A having only a transmission function as shown in FIG. 6 is used as the fixed communication station 12, and reception is not performed. In this manner, the power consumption can be reduced, and a long-time operation can be performed even with a small capacity battery, such as a button battery. Also, location identification information may be intermittently transmitted so that the power consumption can be further reduced.

Likewise, the reception device 21B that has only a reception function as shown in FIG. 7 is used as the communication terminal 11 so that the power consumption can be reduced.

It should be noted that, in the above described example of an intra-body communication process performed by the communication terminal 11 and the fixed communication station 12, location identification information is unidirectionally transmitted from the fixed communication station 12 to the communication terminal 11 on a regular basis.

However, the fixed communication station 12 may be designed to receive a response from the communication terminal 11.

For example, the fixed communication station 12 may transmit a polling message on a regular basis, and, when a response to the polling message is returned from the communication terminal 11, the fixed communication station 12 may transmit location identification information to the communication terminal 11.

Alternatively, when the communication terminal 11 receives location identification information the fixed communication station 12 transmits on a regular basis, the communication terminal 11 may transmit a response indicating receipt of the location identification information to the fixed communication station 12.

Another Embodiment 1 of a Communication Terminal

FIG. 8 is a block diagram showing another embodiment of a communication terminal serving as a reception device that receives location identification information.

The communication terminal 11 shown in FIG. 8 includes a sensor for autonomous location measurement, as well as the above described communication function of intra-body communication.

Specifically, the communication terminal 11 shown in FIG. 8 includes an intra-body communication unit 121, a sensor 122, a location correction unit 123, a smoothing filter 124, a control unit 125, a storage unit 126, and an input/output unit (I/O) 127.

The intra-body communication unit 121 has a configuration similar to that of the transmission/reception device 21 shown in FIG. 2 or a configuration similar to that of the reception device 21B shown in FIG. 7, and executes an intra-body communication function. It should be noted that, of the components of the transmission/reception device 21 in FIG. 2 and the reception device 21B in FIG. 7, the control unit 41, and the storage unit 45, and the input/output unit 46 are replaced, in terms of functions, with the control unit 125, the storage unit 126, and the input/output unit (I/O) 127, respectively, and therefore, can be omitted.

The intra-body communication unit 121 receives location identification information transmitted from the fixed communication station 12, and supplies the location identification information to the location correction unit 123.

The sensor 122 is formed an acceleration sensor, a gyro sensor (an angular velocity sensor), a geomagnetism sensor, or the like. The sensor 122 detects at least one value such as an acceleration rate, an angular velocity, or an orientation, and supplies the location correction unit 123 with the detection result as sensor information.

In accordance with the location identification information supplied from the intra-body communication unit 121, the location correction unit 123 recognizes the location information about the communication terminal 11 (the user 13 carrying the communication terminal 11). In a case where the location identification information is absolute location information such as latitude and longitude, the information is used as it is. However, in a case where the location identification information is a location ID, the location correction unit 123 recognizes the location information corresponding to the location ID by referring to a location database stored in the storage unit 126.

Also, if the location correction unit 123 fails to recognize location information from the location identification information, the location correction unit 123 recognizes location information through autonomous location measurement using the sensor information supplied from the sensor 122.

The location information based on the location identification information supplied from the intra-body communication unit 121 indicates an absolute location, and the location information based on the sensor information is a relative location calculated as a displacement from a reference location. While the location correction unit 123 cannot recognize the absolute location of the device in accordance with location identification information, the location correction unit 123 calculates location information through relative location measurement in accordance with the sensor information. When location identification information is acquired, the location correction unit 123 replaces the location information calculated through the relative location measurement with location information based on the location identification information.

Also, when location information based on location identification information is acquired, the location correction unit 123 corrects the coefficient of the estimating equation for estimating location information (the current location) using the sensor information, so that the difference between the location information based on the acquired absolute location and the location information calculated through autonomous location measurement becomes smaller.

The location correction unit 123 receives feedback about filtered location information from the smoothing filter 124. Accordingly, the location correction unit 123 can use the values in the feedback as the location information about the current location.

A location recognition technique using an absolute position acquired with positioning satellites and a relative location acquired with an acceleration sensor or a gyro sensor is also disclosed in documents, such as "The Development of a Tightly-Coupled INS/GPS Sensors Fusion Scheme Using Adaptive Kalman Filter", ION GNSS 2010, pp. 1,545-1, 553.

In a case where the sensor 122 outputs an orientation as the sensor information, if the intra-body communication unit 121 can also output an orientation as the location identification information, the orientation calculation based on the sensor information can also be corrected, and the location accuracy can be further increased.

In view of this, information indicating an orientation such as east, west, south, or north may be incorporated into the location identification information to be output from the fixed communication station 12, so that the intra-body communication unit 121 can receive the information.

Figure 9B:
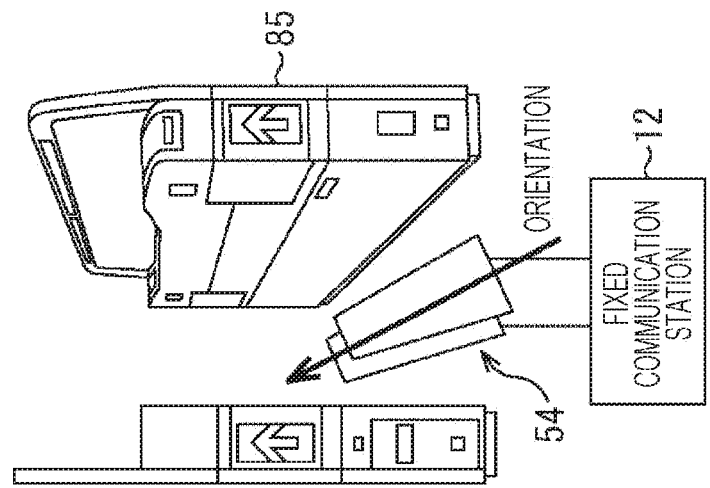
FIGS. 9A, and 9B is a are diagrams for explaining methods of determining an orientation.
Figure 9A:
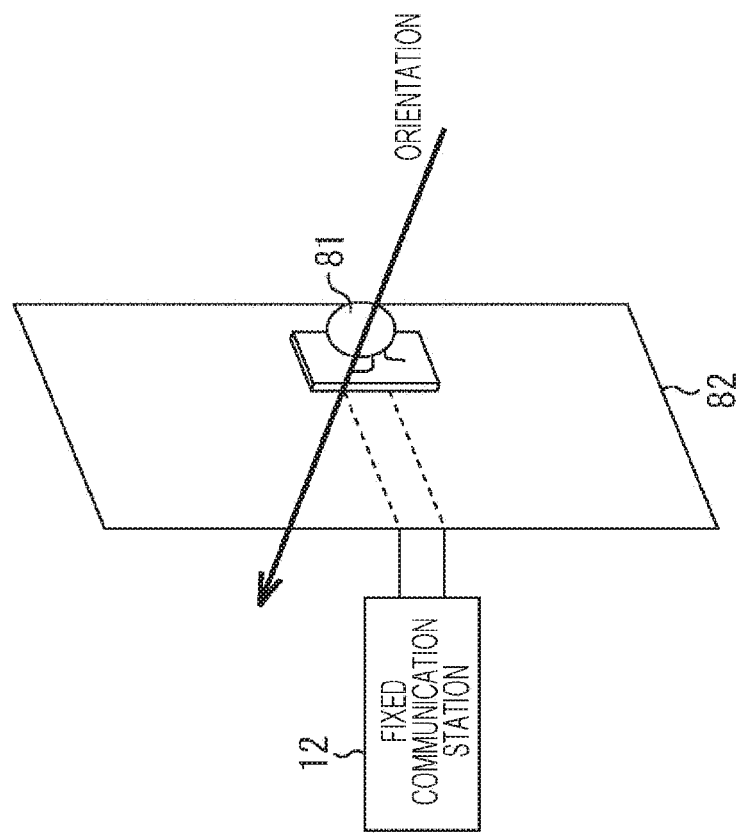

FIGS. 9A, and 9B are diagrams for explaining a method of determining the orientation included in location identification information.

For example, as shown in FIG. 9A, in a case where the fixed communication station 12 is installed in the door 82, an orientation that is a direction perpendicular to the plane of the door 82 may be regarded as the direction of movement of the user 13, and be incorporated into the location identification information.

For example, as shown in FIG. 9B, in a case where the fixed communication station 12 is installed in the automatic ticket gate 85, the orientation that is the forward direction of the gate may be regarded as the direction of movement of the user 13, and be incorporated into the location identification information.

Alternatively, in a case where map information about the place where the fixed communication station 12 is installed is stored in the storage unit 126, the type of the fixed communication station 12 may be incorporated into the location identification information so that the location correction unit 123 can recognize the orientation.

For example, as shown in FIG. 9A, in a case where the fixed communication station 12 is installed in the door 82, the type "door" of the fixed communication station 12 is incorporated into the location identification information. In this case, the location correction unit 123 can detect the installation direction of the door 82 by referring to the map information stored in the storage unit 126, and recognize an orientation that is a direction perpendicular to the door 82, as the direction of movement of the user 13.

Also, as shown in FIG. 9B, in a case where the fixed communication station 12 is installed in the automatic ticket gate 85, for example, the type "automatic ticket gate" of the fixed communication station 12 is incorporated into the location identification information. In this case, the location correction unit 123 can recognize the orientation that is the forward direction of the gate as the direction of movement of the user 13.

Figure 10A:
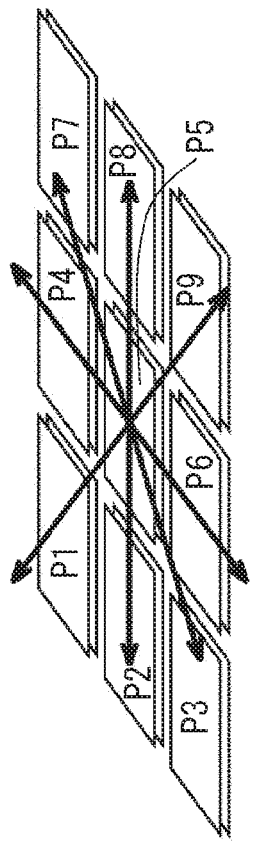
FIGS. 10A, and 10B are diagrams for explaining methods of determining an orientation.
Figure 10B:
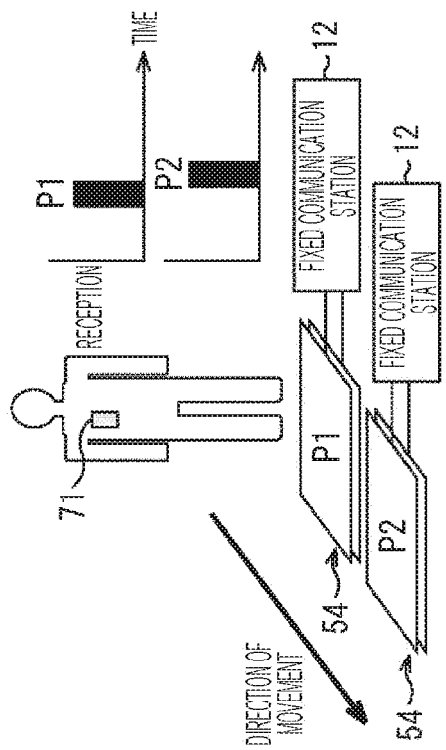

FIGS. 10A, and 10B are diagrams showing examples where an orientation is determined in accordance with two or more fixed communication stations 12 installed adjacent to one another.

In a case where two or more fixed communication stations 12 are installed adjacent to one another, two or more sets of location identification information are successively received within a predetermined short period of time.

For example, as shown in FIG. 10A, in a case where location identification information P1 and location identification information P2, which correspond to two fixed communication stations 12, are successively received in this order within a predetermined time, the location correction unit 123 can recognize the direction from the location indicated by the location identification information P1 toward the location indicated by the location identification information P2 (the direction from P1 toward P2), and output the direction as the orientation of the user 13.

Also, as shown in FIG. 10B, in a case where three fixed communication stations 12 are aligned both in the vertical direction and in the horizontal direction, for example, diagonal directions as well as the four directions can be detected, and thus, finer orientation detection can be performed.

Referring back to FIG. 8, the location correction unit 123 supplies the smoothing filter 124 with the location information based on the location identification information supplied from the intra-body communication unit 121 and the location information determined in accordance with the sensor information supplied from the sensor 122. It should be noted that information indicating velocity and orientation, as well as information indicating latitude and longitude, may be added to the location information as described above.

The smoothing filter 124 is formed with a Kalman filter or the like, and performs a smoothing process on the location information supplied from the location correction unit 123. The location information subjected to the smoothing process is supplied to the control unit 125 and the location correction unit 123.

The control unit 125 is formed with a CPU, a ROM, a RAM, and the like, and controls operation of the entire communication terminal 11 by executing various programs. For example, the control unit 125 acquires the location information supplied from the smoothing filter 124, and stores the location information into the storage unit 126. In a case where the communication terminal 11 is connected to another device via the input/output unit 127, the control unit 125 also controls communication with another device via the input/output unit 127. For example, the control unit 125 acquires, from another device, the map data of the facility in which the fixed communication station 12 is installed or the location database for identifying the location information corresponding to the location ID, and then stores the map data or the location database into the storage unit 126. The control unit 125 also outputs the stay information or the movement path information about the user 13 stored in the storage unit 126, to another device. The stay information and the movement path information about the user 13 are the time-series data of the location information that is stored in the storage unit 126 and indicates the locations the user 13 has stayed at or passed through in the past.

The storage unit 126 stores data and programs supplied from an external device via the input/output unit 127, and location data received by the communication terminal 11. The programs stored in the storage unit 126 include a program for the control unit 125 to control operation of the entire communication terminal 11. The storage unit 126 is formed with a nonvolatile memory such as an EEPROM, or a battery-backed SRAM, for example.

The input/output unit 127 is formed with a UART, for example, and inputs/outputs signals in a predetermined signal format from/to an external device.

<Location Information Calculation Process>

Figure 11:
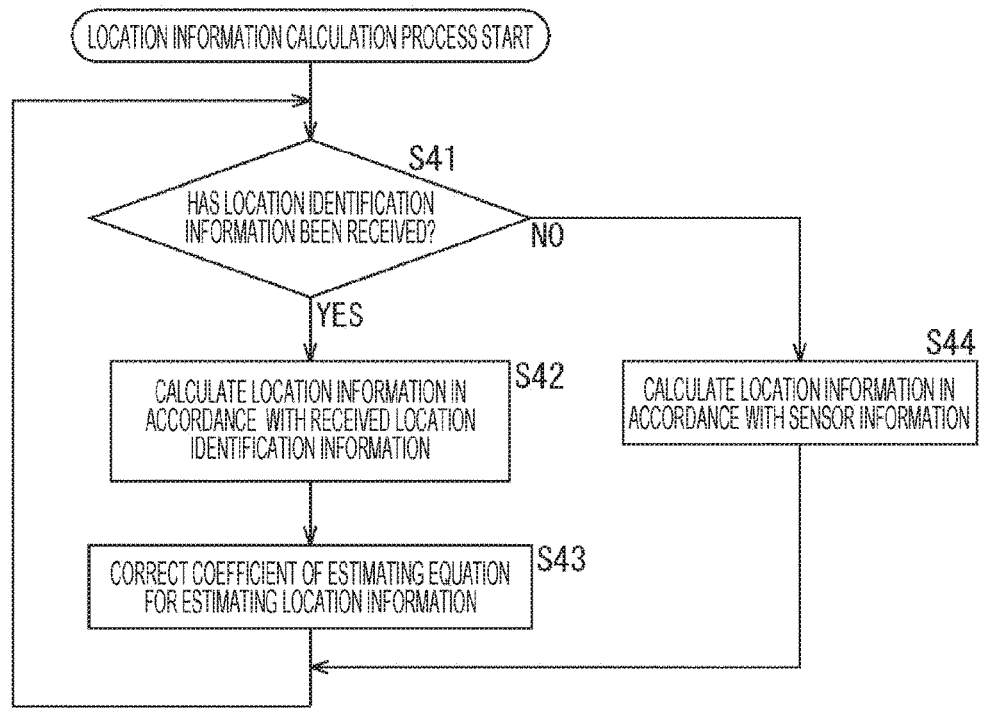
FIG. 11 is a flowchart for explaining a current location calculation process.

FIG. 11 is a flowchart of a location information calculation process to be performed by the location correction unit 123. This process is started when the power supply to the communication terminal 11 is turned on, for example.

First, in step S41, the location correction unit 123 determines whether the intra-body communication unit 121 has received location identification information, or whether location identification information has been supplied from the intra-body communication unit 121.

If the intra-body communication unit 121 is determined to have received location identification information in step S41, and the received location identification information has been supplied from the intra-body communication unit 121 to the location correction unit 123, the process moves on to step S42. In step S42, the location correction unit 123 then calculates location information in accordance with the received location identification information, and supplies the location information to the smoothing filter 124.

In step S43, the location correction unit 123 corrects the coefficient of the estimating equation for estimating location information using the sensor information, so that the difference between the location information as the absolute location based on the acquired location identification information and the location as the relative location calculated through autonomous location measurement becomes smaller.

If it is determined in step S41 that the location identification information has not been received, on the other hand, the process moves on to step S44. In step S44, the location correction unit 123 calculates location information in accordance with the sensor information supplied from the sensor 122, and supplies the location information to the smoothing filter 124. In calculating the location information in accordance with the sensor information, the estimating equation for estimating location information described in step S43 is used.

After step S43 or S44, the process returns to step S41, and the process thereafter is repeated. After subjected to a smoothing process, the location process supplied to the smoothing filter 124 is further supplied to the control unit 125, and is stored into the storage unit 126.

As location measurement through intra-body communication from the fixed communication station 12 and autonomous location measurement using the sensor 122 are both carried out, it becomes possible to achieve high-precision location measurement.

Another Embodiment 2 of a Communication Terminal

Figure 12:
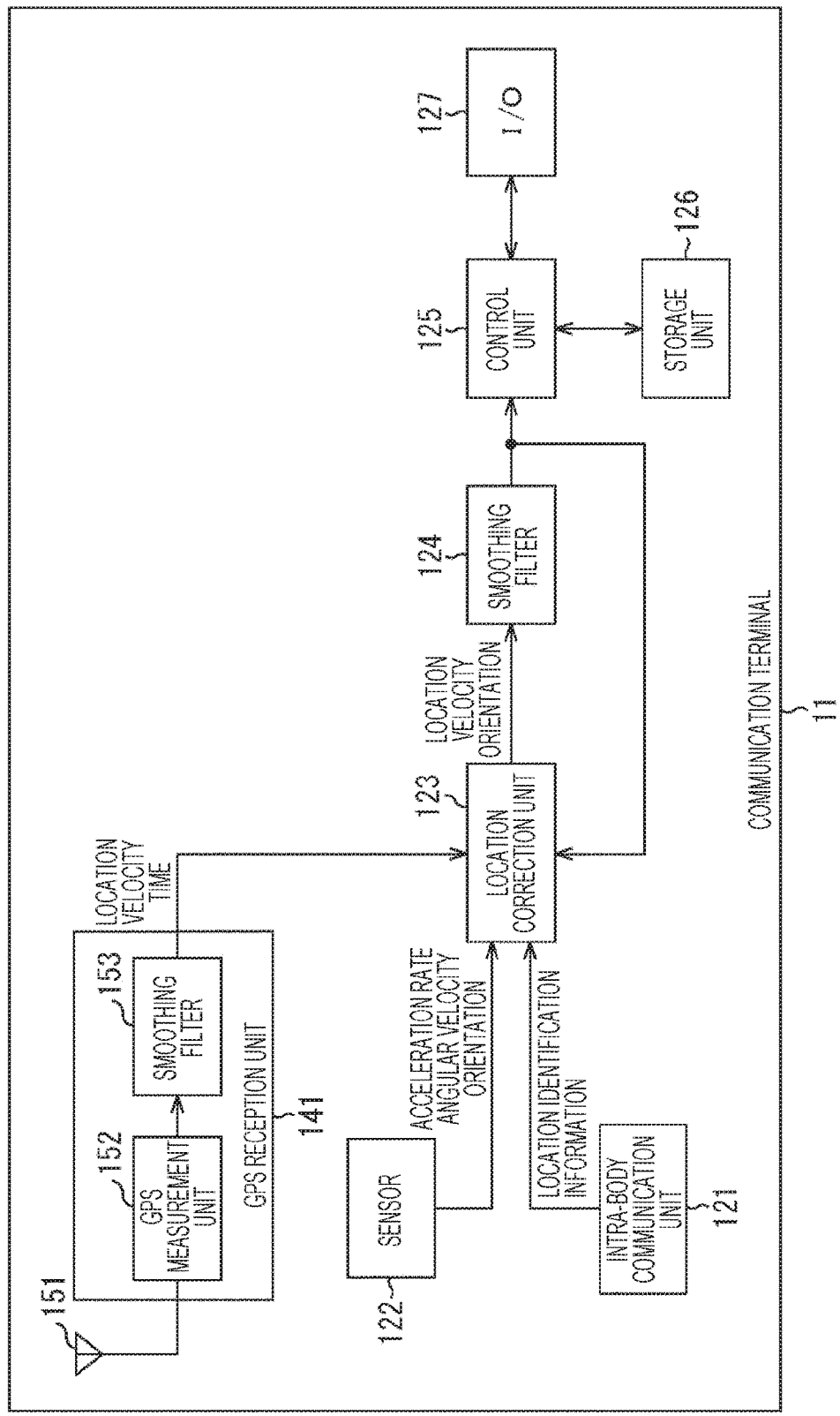
FIG. 12 is a block diagram showing yet another embodiment of a communication terminal.

FIG. 12 is a block diagram showing yet another embodiment of a communication terminal serving as a reception device that receives location identification information.

In FIG. 12, the components equivalent to those shown in FIG. 8 are denoted by the same reference numerals as those used in FIG. 8, and explanation of them will not be repeated below.

The communication terminal 11 shown in FIG. 12 differs from the configuration shown in FIG. 8 in further including a GPS reception unit 141 that receives transmission signals transmitted from GPS satellites (these signals will be hereinafter referred to as GPS signals) and acquires location information. The other aspects of the configuration of the communication terminal 11 in FIG. 12 are similar to those shown in FIG. 8.

The GPS reception unit 141 includes an antenna 151, a GPS measurement unit 152, and a smoothing filter 153. A GPS signal received by the antenna 151 is supplied to the GPS measurement unit 152. The GPS measurement unit 152 calculates GPS location information about the communication terminal 11 in accordance with the GPS signal, and supplies the GPS location information to the smoothing filter 153. The smoothing filter 153 is formed with a Kalman filter or the like. The smoothing filter 153 performs a smoothing process on the GPS location information supplied from the GPS measurement unit 152, and supplies the result to the location correction unit 123. The GPS reception unit 141 can supply the location correction unit 123 with GPS location information such as the current location, the moving velocity, and time (the current time).

When the user 13 is moving in an outdoor space where any fixed communication station 12 is not installed, the location correction unit 123 acquires the location information about the communication terminal 11 (or the user 13 carrying the communication terminal 11), using the GPS location information supplied from the GPS reception unit 141. For example, in a case where GPS location information is supplied from the GPS reception unit 141, and location identification information has not been supplied from the intra-body communication unit 121 for a certain period of time, the location correction unit 123 determines that the user 13 is moving in an outdoor space, and calculates the location information about the user 13 in accordance with the GPS location information.

Also, in a case where GPS location information is supplied from the GPS reception unit 141, and location identification information has been supplied from the intra-body communication unit 121 within a certain period of time, the location correction unit 123 uses the GPS location information as supplementary information like the sensor information from the sensor 122.

That is, while the location identification information supplied from the intra-body communication unit 121 is high-precision location information based on contact of the user 13 with the fixed communication station 12 or proximity of the user 13 to the fixed communication station 12, the GPS location information is location information with a margin of error of several meters to several tens of meters. Therefore, in a case where location identification information has been supplied from the intra-body communication unit 121 within a certain period of time, priority is given to the location identification information supplied from the intra-body communication unit 121, and the GPS location information is used as supplementary information in calculating location information between fixed communication stations 12, like the sensor information from the sensor 122.

Although not shown in the drawings, the communication terminal 11 may further have a function of receiving a transmission signal (a wireless LAN signal) of a wireless local area network (LAN) that is typically Wi-Fi (trademark). For example, the communication terminal 11 may further have a function of acquiring location information by receiving a MAC address that is information unique to a fixed access point of a wireless LAN and acquiring the installation location of the fixed access point.

Meanwhile, GPS satellites are positioning satellites operated by the United States. However the GPS reception unit 141 may have a function of acquiring location information by receiving transmission signals transmitted from positioning satellites of some other satellite positioning system (Global Navigation Satellite System (GNSS)), such as Global Orbiting Navigation Satellite System (GLONASS) operated by the Russian Federation or Galileo operated by the EU.

<Examples of Use of the Reception Function of a Fixed Communication Station>

Examples of use of the reception function in a case where the fixed communication station 12 is formed with the transmission/reception device 21 shown in FIG. 2 are now described.

In a case where the fixed communication station 12 has a reception function, the fixed communication station 12 can measure a staying time of the user 13 at a place where the fixed communication station 12 is installed.

Figure 13:
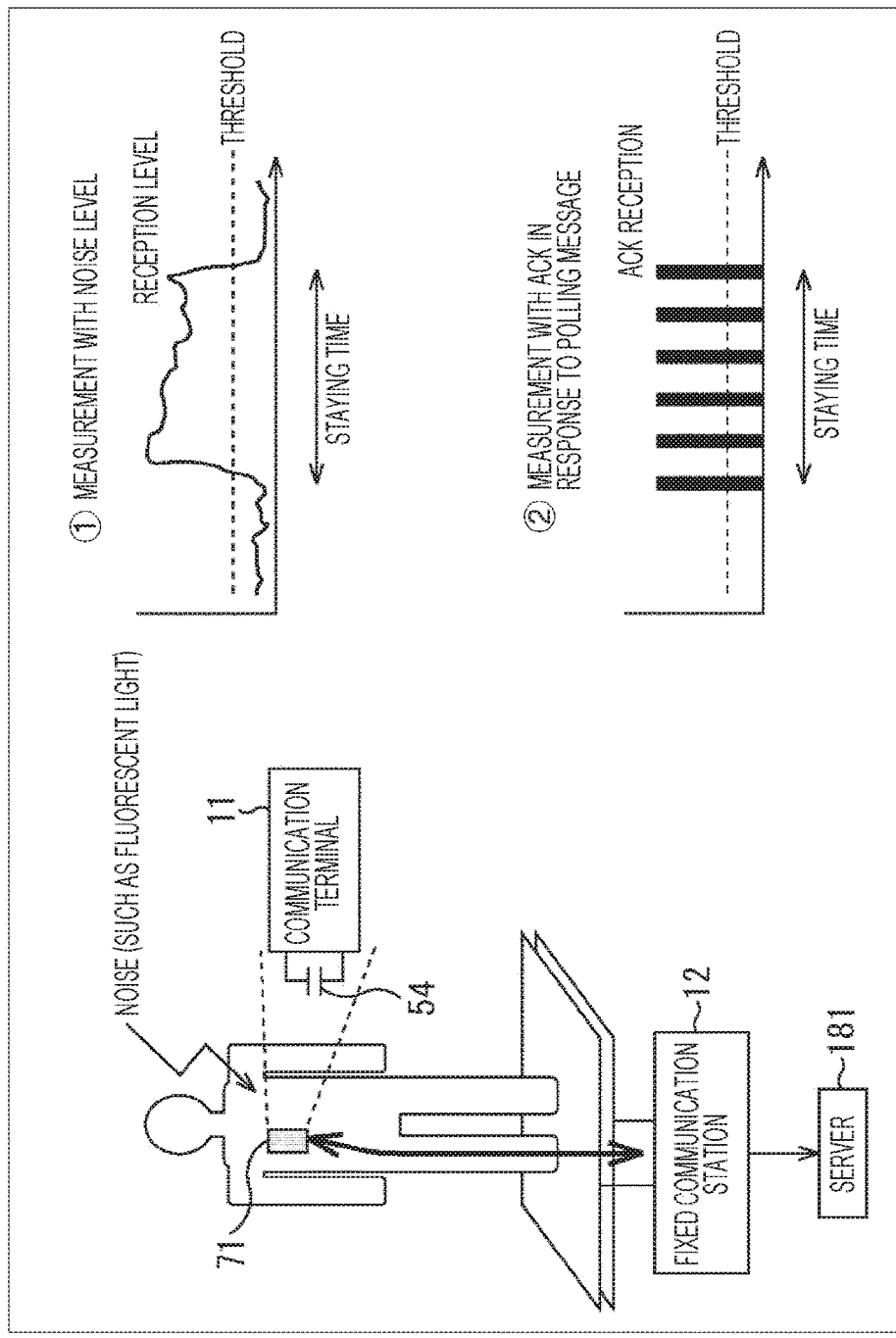
FIG. 13 is a diagram for explaining methods of measuring a staying time.

The fixed communication station 12 can measure a staying time of the user 13 by the two methods shown in FIG. 13.

One of the measurement methods is a method of carrying out measurement with a noise level.

In a case where the user 13 is in contact with or in the vicinity of the fixed communication station 12, the body of the user 13 is affected by fluorescent light or the like, and then affects the electrical field generated around the electrodes 54, since the human body is a conductor. When not transmitting location identification information, the fixed communication station 12 observes the level (voltage level) of the noise signal detected by the electrodes 54, so that the period of time during which the level of the noise signal continues to be higher than a predetermined threshold can be measured as a staying time of the user 13. It is also possible to detect the existence of a user and measure a staying time by determining whether the noise signal level is changing in a predetermined manner, instead of whether the noise signal level is higher than the threshold. For example, staying time measurement may be started when the noise signal level shows a certain increase, and the staying time measurement may be ended when the noise signal level shows a certain decrease.

The other one of the measurement methods is a method of carrying out measurement by receiving a response signal to a polling message.

In a case where the fixed communication station 12 transmits a polling message on a regular basis, and an ACK signal (a response signal) in response to the polling message is received from the communication terminal 11, the period during which the ACK signal is continuously received can be measured as a staying time of the user 13. In a similar manner, the control unit 41 of the transmission/reception device 21 operating as the fixed communication station 12 functions as a measurement unit that measures a staying time of a user staying near the device.

The fixed communication station 12 may implement only one of the above two measurement methods, or may selectively implement one of the two measurement methods.

The communication terminal 11 may transmits a response signal containing terminal identification information (a terminal ID) for uniquely identifying the communication terminal 11. In this case, the fixed communication station 12 transmits the received terminal identification information to a server 181 that manages received information. With this, in a case where fixed communication stations 12 are installed in the respective shops in a commercial facility formed with the shops, for example, the server 181 that manages information gathered by the fixed communication stations 12 compares the information with a user database that manages the user 13 owning the communication terminal 11, to figure out which user has visited which shops and looked at (stayed in) which parts in the shops. Further, in a case where the user database stores user information such as the gender and the age of the user 13, the server 181 can conduct more specific customer analyses such as analyses according to classification by gender and age, for example. For the user 13 who has visited a shop more than a predetermined number of times or stayed over a predetermined time, for example, the shop can provide the user 13 with services such as issuing discount coupons for purchases or transmitting web information.

For example, techniques such as iBeacon (trademark) for carrying out indoor location measurement and providing push services using Bluetooth Low Energy (BLE) or the like have been developed. However, radio beacons of Wi-Fi (trademark) and Bluetooth (registered trademark) have wider communication ranges than that of intra-body communication, and therefore, it is difficult to analyze which user has stayed in front of which product (place) or the like.

In the communication system 1 using intra-body communication, on the other hand, the communication range is limited to such a range that the user 13 is in contact with or in the vicinity of the fixed communication station 12, so that the locations and the staying times of the target customer can be analyzed with high accuracy.

<Staying Time Calculation Process>

Figure 14:
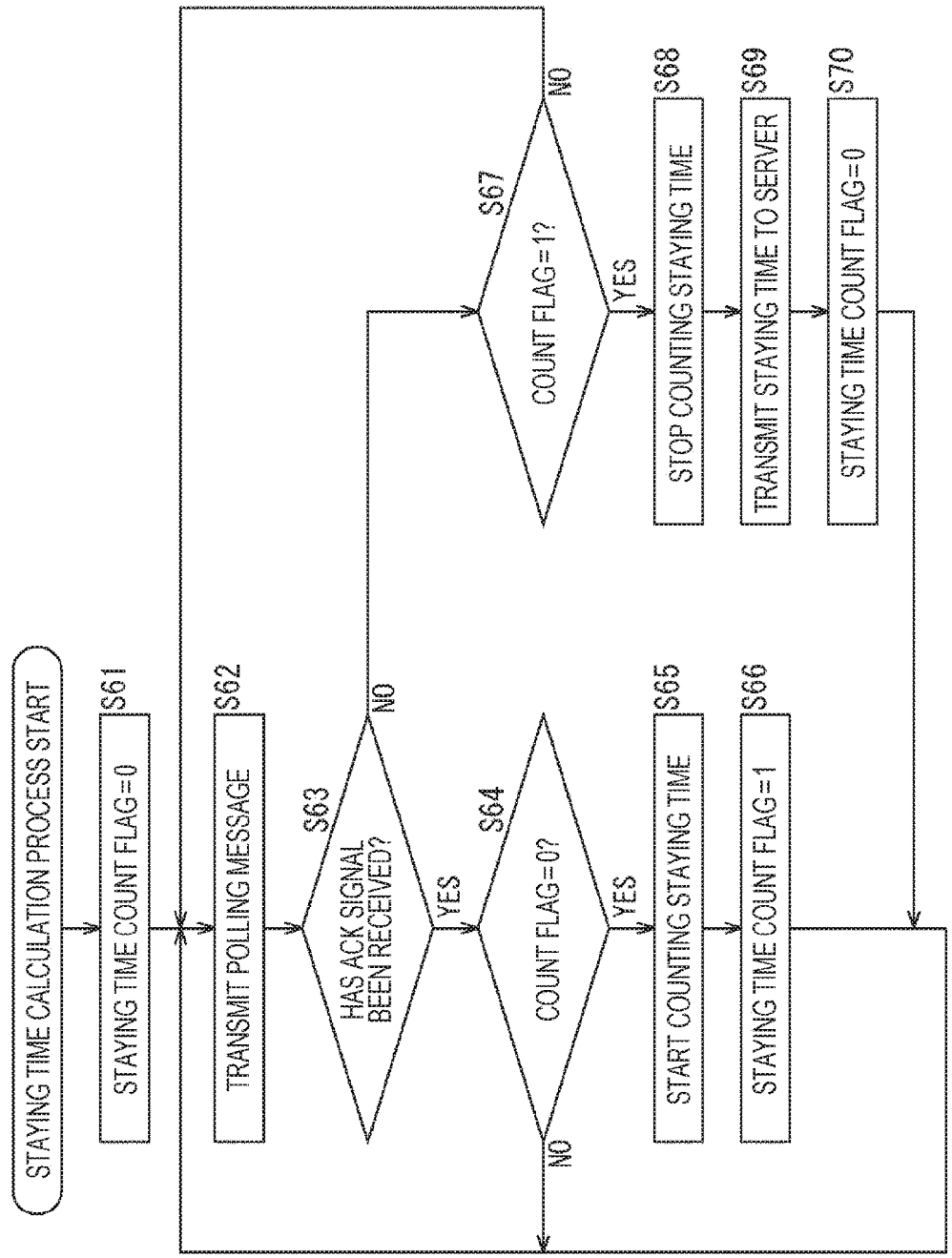
FIG. 14 is a flowchart for explaining a staying time calculation process.

Referring now to the flowchart in FIG. 14, a staying time calculation process in a case where a staying time is measured through ACK signal reception is described. This process is started when the power supply to the fixed communication station 12 is turned on, for example.

First, in step S61, the fixed communication station 12 sets a count flag indicating whether a staying time is being counted, at the initial value "0".

In step S62, the fixed communication station 12 transmits a polling message. In step S63, the fixed communication station 12 determines whether an ACK signal in response to the transmitted polling message has been received.

If it is determined in step S63 that an ACK signal has been received, the process moves on to step S64, and the fixed communication station 12 determines whether the count flag is "0".

If the count flag is determined to be "0" in step S64, or if any staying time is not being counted, the process moves on to step S65, and the fixed communication station 12 starts the counting of a staying time. In step S66, the count flag is set at "1", and the process returns to step S62.

If the count flag is determined to be "1" in step S64, or if a staying time is being counted, on the other hand, the process returns directly to step S62, and the counting of the staying time is continued.

If it is determined in step S63 that any ACK signal has not been received, the process moves on to step S67, and the fixed communication station 12 determines whether the count flag is "1".

If the count flag is determined not to be "1" in step S67, or if any staying time is not being counted, the process returns to step S62.

If the count flag is determined to be "1" in step S67, or in a case where a staying time is being counted and the reception of the ACK signal has stopped, the process moves on to step S68, and the fixed communication station 12 stops the counting of the staying time.

In step S69, the fixed communication station 12 transmits the counted staying time of the user 13, together with the information for identifying the fixed communication station 12, to the server 181. In a case where the terminal identification information for identifying the communication terminal 11 and the like have also been received, the fixed communication station 12 also transmits these pieces of information to the server 181.

After that, the process moves on to step S70, and the fixed communication station 12 sets the count flag at "0". The process then returns to step S62. As a result, step S62 and the later steps are again repeated.

As described above, an ACK signal is received so that the staying status of the user 13 at a predetermined location can be measured with high accuracy, in accordance with the high-precision location information corresponding to the installation location of the fixed communication station 12.

It should be noted that, in a case where a staying time is measured in accordance with noise level, a check can be made in step S63 to determine whether a noise signal level equal to or higher than a predetermined threshold has been detected. In this manner, the staying status of the user 13 can also be measured with high accuracy.

The location identification information about the fixed communication station 12 may be transmitted as part of a polling command, or may be transmitted separately from any polling command.

<Power Saving Operation in the Communication Terminal>

Figure 15:
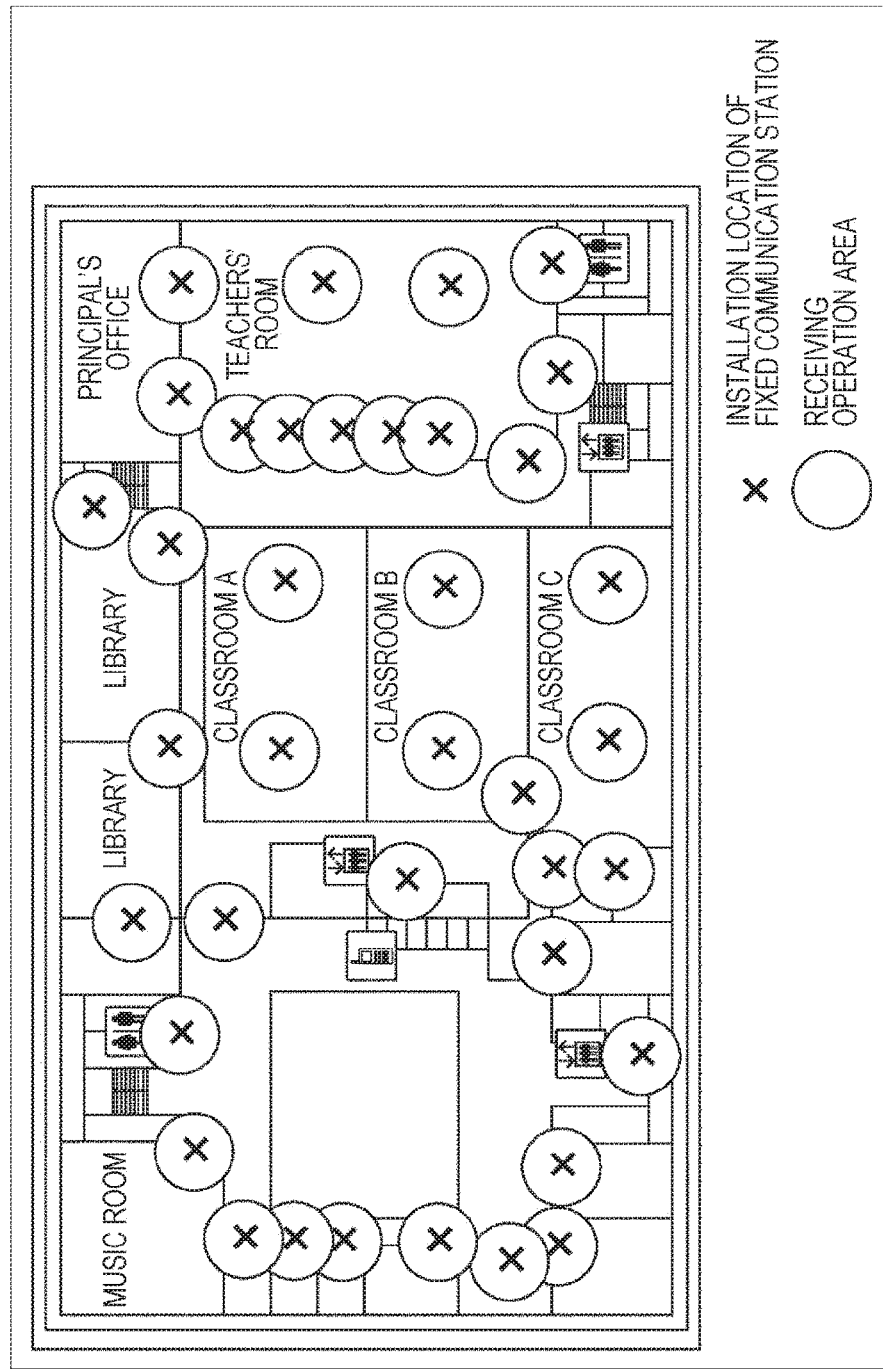
FIG. 15 is a diagram for explaining a power saving function.

Referring now to FIG. 15, a power saving function on the side of the communication terminal 11 is described.

In intra-body communication, the power consumed by the operation on the reception side is larger than that on the transmission side. Therefore, the communication terminal 11 has an autonomous location measurement function using sensor information, as well as an intra-body communication function, as described above with reference to FIGS. 8 and 12. Map information indicating the installation locations of fixed communication stations 12 as shown in FIG. 15 is stored in the storage unit 126 so that the operation described below can be performed.

The communication terminal 11 refers to the map information stored in the storage unit 126, to perform an intra-body communication receiving operation only when located within a predetermined distance from the installation location of a fixed communication station 12, and stop the intra-body communication receiving operation at other times.

In FIG. 15, a cross mark (X) represents the installation location of a fixed communication station 12 included in the map information, and the circular area outside each cross mark (X) represents an receiving operation area in which the communication terminal 11 is to perform a receiving operation through intra-body communication.

In the areas other than the receiving operation areas of intra-body communication, the communication terminal 11 recognizes location information through autonomous location measurement using sensor information.

<Power-Saving Reception Process>

Referring now to the flowchart in FIG. 16, a power-saving reception process to be performed by the communication terminal 11 in FIG. 8 or 12 is described. It should be noted that, before this process is started, the current location should be recognized, and the map information indicating the installation locations of the fixed communication stations 12 in the facility in which the user 13 is currently staying needs to be stored in the storage unit 126.

First, in step S81, the control unit 125 determines whether the current location is within a predetermine range from the installation location of a fixed communication station 12, or whether the current location is within a receiving operation area of intra-body communication.

If the current location is determined to be within the predetermined range from the installation location of a fixed communication station 12 in step S81, the process moves on to step S82, and the control unit 125 switches on the reception function of intra-body communication. In step S83, the control unit 125 recognizes the current location in accordance with location identification information received through intra-body communication.

If the current location is determined not to be within the predetermined range from the installation location of any fixed communication station 12 in step S81, on the other hand, the process moves on to step S84, and the control unit 125 switches off the reception function of intra-body communication. In step S85, the control unit 125 recognizes the current location in accordance with sensor information acquired by the sensor 122.

After step S83 or S85, the control unit 125 in step S86 updates the current location stored therein to the newly recognized current location. After that, the process returns to step S81, and the above described procedures are repeated.

As the above power-saving reception process is performed, the reception function of intra-body communication can be stopped, and accordingly, the power consumption can be reduced. In the example shown in FIG. 15, the range in which the reception function of intra-body communication can be stopped is wide relative to the area of the entire facility. Many actual facilities are likely to be in such conditions, and a great power saving effect can be expected.

As described so far, with the communication system 1 of the present disclosure, it is possible to acquire location information by receiving location identification information transmitted from a fixed communication station 12 the user 13 has touched or approached, through intra-body communication using the human body as the communication medium.

Location measurement using access points of Wi-Fi (trademark) has a margin of error of several meters to several tens of meters. Location measurement using radio beacons of Bluetooth (registered trademark) has a margin of error of several meters. In a case where intra-body communication is used, on the other hand, accurate location information with a margin of error of one meter or less can be acquired.

Accordingly, with the communication system 1 of the present disclosure, it is possible to acquire location information with higher accuracy than by a location measurement method using Wi-Fi (trademark) or Bluetooth (registered trademark). That is, accurate location information can be acquired in indoor environments.

Furthermore, while electrical power on the order of mW at a minimum is required for transmission in wireless communication using Wi-Fi (trademark) or Bluetooth (registered trademark), intra-body communication can be performed with electric power of 1 mW or less. Accordingly, the transmission/reception device 21 and the like can be manufactured at low costs, and an infrastructure for indoor location measurement can be easily created.

In this specification, the steps shown in the flowcharts are carried out in chronological order in accordance with the described sequences. However, those steps may not be carried out in chronological order, but may be carried out in parallel or be carried out when necessary such as when there is a call for them.

It should be noted that, in this specification, a system means an assembly of components (devices, modules (parts), and the like), and not all the components need to be provided in the same housing. In view of this, devices that are housed in different housings and are connected to one another via a network form a system, and one device having modules housed in one housing is also a system.

It should be noted that embodiments of the present disclosure are not limited to the above described embodiments, and various modifications may be made to them without departing from the scope of the present disclosure.

For example, it is possible to employ a combination of all or some of the above described embodiments.

For example, the present disclosure can be embodied in a cloud computing configuration in which one function is shared among devices via a network, and processing is performed by the devices cooperating with one another.

Also, the respective steps described with reference to the above described flowcharts can be carried out by one device or can be shared among devices.

Further, in a case where more than one process is included in one step, the processes included in the step can be performed by one device or can be shared among devices.

It should be noted that the advantageous effects described in this specification are merely examples, and the advantageous effects of the present technology are not limited to them and may include effects other than those described in this specification.

It should be noted that the present disclosure may also be embodied in the configurations described below.

(1)

A reception device including:

an intra-body communication reception unit that receives location identification information from another device by a communication method using the human body as the communication medium, the location identification information being for identifying the location of the reception device;

a location recognition unit that recognizes the current location of the reception device in accordance with the received location identification information; and a storage unit that stores the recognized current location.

(2)

The reception device of (1), wherein the location recognition unit recognizes the current location also in accordance with sensor information from a sensor that detects physical displacement of the reception device.

(3)

The reception device of (2), further including the sensor.

(4)

The reception device of (2) or (3), wherein, when the current location is recognized in accordance with the received location identification information, the location recognition unit corrects an estimating equation for estimating a current location based on the sensor information.

(5)

The reception device of any of (1) to (4), wherein the storage unit further stores map information indicating the place where the another device is installed, and, in accordance with the map information, the intra-body communication reception unit performs a receiving operation to receive the location identification information only within a predetermined range from the place where the another device is installed.

(6)

The reception device of any of (1) to (5), wherein the storage unit further stores map information indicating the place where the another device is installed, the location identification information includes information indicating the type of the another device, and, in accordance with the map information and the information indicating the type of the another device, the location recognition unit recognizes an orientation.

(7)

The reception device of any of (1) to (6), wherein the location identification information is information for identifying predetermined location information in a location database.

(8)

The reception device of any of (1) to (7), wherein the location identification information further includes orientation information.

(9)

The reception device of any of (1) to (8), wherein the location recognition unit recognizes an orientation in accordance with two sets of the location identification information received from two other devices within a predetermined time.

(10)

The reception device of any of (1) to (9), further including a satellite signal reception unit that receives a transmission signal transmitted from a positioning satellite, wherein the location recognition unit recognizes the current location also in accordance with the transmission signal received from the positioning satellite.

(11)

The reception device of any of (1) to (10), wherein the location identification information is location information.

(12)

A reception method implemented by a reception device that includes a storage unit storing predetermined information, the reception method including:

receiving location identification information from another device by a communication method using the human body as the communication medium, the location identification information being for identifying the location of the reception device; and recognizing the current location of the reception device in accordance with the received location identification information, and storing the current location into the storage unit.

(13)

A program for causing a computer to perform a process that includes:

controlling reception of location identification information from another device by a communication method using the human body as the communication medium, the location identification information being for identifying the location of the computer;

recognizing the current location of the computer in accordance with the received location identification information; and storing the recognized current location into a storage unit.

(14)

A transmission device including:

a storage unit that stores location identification information for identifying the location of the transmission device; and an intra-body communication transmission unit that transmits the location identification information to another device by a communication method using the human body as the communication medium.

(15)

The transmission device of (14), further including:

an intra-body communication reception unit that receives a signal by the communication method; and a measurement unit that measures a staying time in accordance with the signal received by the intra-body communication reception unit, the staying time being the time during which the user carrying the another device stays near the transmission device.

(16)

The transmission device of (15), wherein the measurement unit measures the staying time in accordance with a change in the signal level of the signal received by the intra-body communication reception unit.

(17)

The transmission device of (15) or (16), wherein the measurement unit measures the staying time in accordance with a response signal transmitted from the another device.

(18)

The transmission device of any of (15) to (17), wherein the intra-body communication reception unit receives identification information from the another device, the identification information being for identifying the another device.

(19)

A transmission method implemented by a transmission device that includes a storage unit storing location identifying information for identifying the location of the transmission device, the transmission method including transmitting the location identification information to another device by a communication method using the human body as the communication medium.

(20)

A program for causing a computer to perform a process that includes:

transmitting location identification information to another device by a communication method using the human body as the communication medium, the location identification information being stored in a storage unit and being for identifying the location of the computer.

REFERENCE SIGNS LIST

1 Communication system
11 Communication terminal
12 Fixed communication station
13 User
21 Transmission/reception device
21A Transmission device
21B Reception device
41 Control unit 42 Modulation unit
44 Demodulation unit
45 Storage unit
46 Input/output unit
54 (54A, 54B) Electrode
121 Intra-body communication unit
122 Sensor
123 Location correction unit
125 Control unit
126 Storage unit
127 Input/output unit
141 GPS reception unit
152 GPS measurement unit
181 Server

The invention claimed is:

1. A reception device, comprising:
an intra-body communication reception unit configured to receive, via a communication method that uses a human body as a communication medium, location identification information from an external device to identify a location of the reception device;
a sensor configured to detect physical displacement of the reception device;
a location recognition unit configured to:
recognize a current location of the reception device based on the received location identification information and the detected physical displacement;
correct an estimating equation based on the detected physical displacement; and
estimate the current location based on the corrected estimating equation; and
a storage unit configured to store the recognized current location.

2. The reception device according to claim 1, wherein
the storage unit is further configured to store map information indicating a place of installation of the external device, and
the intra-body communication reception unit is further configured to receive, based on the map information, the location identification information within a specific range from the place of installation of the external device.

3. The reception device according to claim 1, wherein
the storage unit is further configured to store map information indicating a place of installation of the external device,
the location identification information includes information indicating a type of the external device, and
the location recognition unit is further configured to recognize an orientation of the place of installation of the external device based on the map information and the information indicating the type of the external device.

4. The reception device according to claim 1, wherein the location identification information is information to identify specific location information in a location database.

5. The reception device according to claim 1, wherein
the location identification information includes orientation information, and
the orientation information indicates an orientation of a place of installation of the external device.

6. The reception device according to claim 1, wherein
the location recognition unit is further configured to recognize an orientation of a place of installation of the external device based on at least two sets of the location identification information received from at least two devices within a threshold time duration, and the at least two devices are different from the external device.

7. The reception device according to claim 1, further comprising a satellite signal reception unit configured to receive a transmission signal from a positioning satellite, wherein
the location recognition unit is further configured to recognize the current location based on the received transmission signal.

8. A reception method, comprising:
in a reception device that includes a storage unit:
receiving, via a communication method that uses a human body as a communication medium, location identification information from an external device to identify a location of the reception device;
detecting physical displacement of the reception device by a sensor;
recognizing a current location of the reception device based on the received location identification information and the detected physical displacement;
correcting an estimating equation based on the detected physical displacement;
estimating the current location based on the corrected estimating equation; and
storing the current location into the storage unit.

9. A non-transitory computer-readable medium having stored thereon computer-readable instructions, which when executed by a computer, cause the computer to execute operations, the operations comprising:
controlling, via a communication method that uses a human body as a communication medium, reception of location identification information in a reception device from an external device to identify a location of the reception device;
detecting physical displacement of the reception device by a sensor;
recognizing a current location of the reception device based on the received location identification information and the detected physical displacement;
correcting an estimating equation based on the detected physical displacement;
estimating the current location based on the corrected estimating equation; and
storing the recognized current location into a storage unit of the reception device.

10. A transmission device, comprising:
a storage unit configured to store location identification information to identify a location of the transmission device;
an intra-body communication transmission unit configured to transmit, via a communication method that uses a human body as a communication medium, the location identification information to an external device, wherein the location identification information indicates an orientation of a place of installation of the transmission device;
an intra-body communication reception unit configured to receive a signal from the external device via the communication method; and
a measurement unit configured to measure a staying time based on the received signal, wherein the staying time is a time duration for which the external device is within a threshold distance of the transmission device.

11. The transmission device according to claim 10, wherein the measurement unit is further configured to measure the staying time based on a change in a strength of the received signal.

12. The transmission device according to claim 10, wherein the measurement unit is further configured to measure the staying time based on a response signal transmitted from the external device.

13. The transmission device according to claim 10, wherein the intra-body communication reception unit is further configured to:
- receive identification information from the external device; and
- identify the external device based on the identification information.

14. A transmission method, comprising:
in a transmission device that includes a storage unit:
- storing, in the storage unit, location identification information to identify a location of the transmission device;
- transmitting, via a communication method that uses a human body as a communication medium, the location identification information to an external device, wherein the location identification information indicates an orientation of a place of installation of the transmission device;
- receiving a signal form the external device via the communication method; and
- measuring a staying time based on the received signal, wherein the staying time is a time duration for which the external device is within a threshold distance of the transmission device.

15. A non-transitory computer-readable medium having stored thereon computer-readable instructions, which when executed by a computer, cause the computer to execute operations, the operations comprising:
- storing location identification information to identify a location of a transmission device;
- transmitting, via a communication method that uses a human body as a communication medium, the location identification information to an external device, wherein the location identification information indicates an orientation of a place of installation of the transmission device;
- receiving a signal from the external device via the communication method; and
- measuring a staying time based on the received signal, wherein the staying time is a time duration for which the external device is within a threshold distance of a transmission device.

16. A reception device, comprising:
an intra-body communication reception unit configured to receive, via a communication method that uses a human body as a communication medium, location identification information from an external device to identify a location of the reception device, wherein
- the location identification information is received, based on map information, within a specific range from a place of installation of the external device, and
- the location identification information indicates an orientation of the place of installation of the external device;
a sensor configured to detect physical displacement of the reception device;
a location recognition unit configured to recognize a current location of the reception device based on the received location identification information and the detected physical displacement; and
a storage unit configured to store the recognized current location and the map information indicating the place of installation of the external device.

* * * * *